(12) United States Patent
Whiteman et al.

(10) Patent No.: US 11,787,286 B2
(45) Date of Patent: Oct. 17, 2023

(54) AXLE ASSEMBLY WITH TORQUE SENSOR

(71) Applicant: Deere & Company, Moline, IL (US)

(72) Inventors: Steven R. Whiteman, Asbury, IA (US); Jeffrey D. Miller, Sherrill, IA (US); Jonathan D. Forster, Wann, OK (US); Andrew McKean, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/810,999

(22) Filed: Jul. 6, 2022

(65) Prior Publication Data
US 2022/0332187 A1 Oct. 20, 2022

Related U.S. Application Data

(63) Continuation-in-part of application No. 17/095,284, filed on Nov. 11, 2020, now Pat. No. 11,441,655.
(Continued)

(51) Int. Cl.
B60K 23/04 (2006.01)
B60K 17/16 (2006.01)
F16H 48/08 (2006.01)
F16H 48/20 (2012.01)
F16H 57/037 (2012.01)
(Continued)

(52) U.S. Cl.
CPC ............. B60K 23/04 (2013.01); B60K 17/16 (2013.01); F16H 48/08 (2013.01); F16C 2233/00 (2013.01); F16H 48/22 (2013.01); F16H 57/037 (2013.01); F16H 2048/207 (2013.01);
(Continued)

(58) Field of Classification Search
CPC ......... F16H 57/037; F16H 2057/02052; F16H 57/021; G01L 5/0004; G01L 5/0009; G01L 5/0019; F16C 19/522; F16C 2233/00
See application file for complete search history.

(56) References Cited

U.S. PATENT DOCUMENTS 5,033,315 A * 7/1991 Merten .................. G01L 5/0019
73/862.391
8,740,741 B2 * 6/2014 Wood, Jr. ................ F16H 48/22
475/160
(Continued)

FOREIGN PATENT DOCUMENTS

DE 10059503 A1 * 6/2002 ........... F16H 57/033
DE 102011054967 A1 * 5/2013 ............ F16C 19/522
(Continued)

Primary Examiner — Ernesto A Suarez
Assistant Examiner — James J Taylor, II

(57) ABSTRACT

A torque sensing assembly of a differential of an axle assembly is described in the present disclosure. The differential may include a differential housing portion, a drive pinion positioned within the differential housing portion, a ring gear, a carrier, a differential pinion, a first side gear, a second side gear, a first bearing, a first bearing support, and the torque sensing assembly. The first bearing is coupled to the differential housing portion and rotatable with the carrier. The first bearing support is coupled to the differential housing portion and used to support the first bearing. The torque sensing assembly is coupled to the first bearing support and operable to measure a characteristic resulted from a separation force created between the drive pinion and ring gear.

20 Claims, 18 Drawing Sheets

Related U.S. Application Data

(60) Provisional application No. 62/952,217, filed on Dec. 20, 2019.

(51) Int. Cl.
 *F16H 48/22* (2006.01)
 *G01L 5/00* (2006.01)

(52) U.S. Cl.
 CPC .......... *G01L 5/0004* (2013.01); *G01L 5/0009* (2013.01); *G01L 5/0019* (2013.01)

(56) References Cited

U.S. PATENT DOCUMENTS

| | | |
|---|---|---|
| 9,683,553 B2 | 6/2017 | Mashtare et al. |
| 9,856,967 B2 | 1/2018 | Morselli et al. |
| 10,466,120 B2 * | 11/2019 | Groche ................. G01L 1/2225 |
| 10,583,893 B2 | 3/2020 | O'Connor et al. |
| 10,837,544 B2 * | 11/2020 | Dewa ................. F16H 57/0424 |
| 10,914,368 B2 * | 2/2021 | Chen ................... F16H 25/2204 |
| 2019/0265116 A1 | 8/2019 | Tsukuda et al. |

FOREIGN PATENT DOCUMENTS

| | | |
|---|---|---|
| DE | 102016104592 A1 * | 9/2017 |
| JP | 2010230347 A | 10/2010 |

* cited by examiner

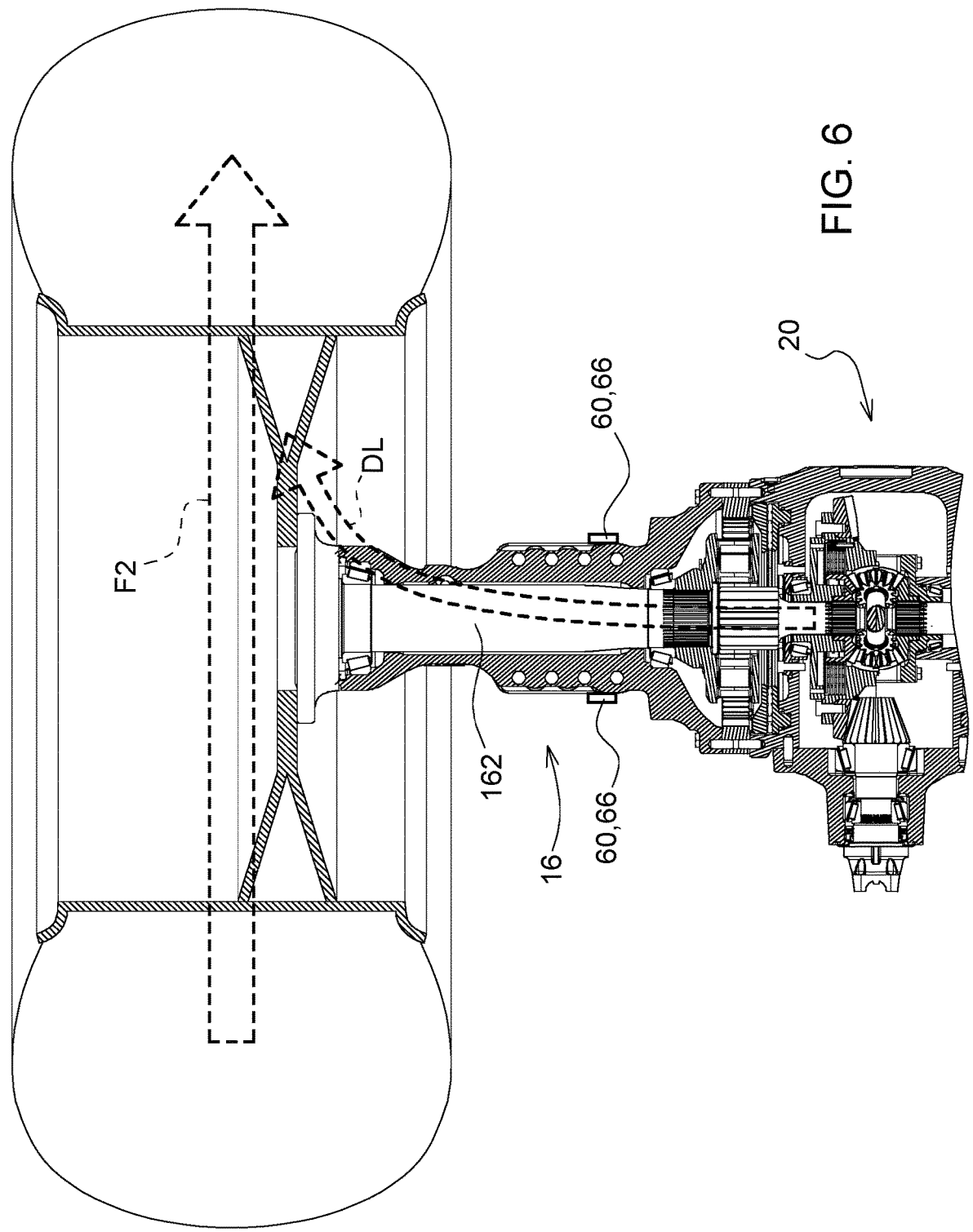

AXLE ASSEMBLY WITH TORQUE SENSOR

RELATED APPLICATIONS

This application is a continuation in part of U.S. patent application Ser. No. 17/095,284, titled Axle Assembly with Torque Sensor, filed Nov. 11, 2020, which claims priority to U.S. Application No. 62/952,217, titled Torque Sensor, filed on Dec. 20, 2019, which is hereby incorporated by reference in its entirety.

FIELD OF THE DISCLOSURE

The present disclosure relates generally to an axle assembly and a torque sensing assembly applied on an axle assembly.

BACKGROUND OF THE DISCLOSURE

For mechanical powertrain systems, measurement of axle torque applied to an axle assembly such as a front axle assembly is desirable since it may affect the efficiency and longevity of individual powertrain components and may provide information for further use or processing relating to the operation of the vehicle and any connected implements or attachments.

SUMMARY OF THE DISCLOSURE

An axle assembly coupled to a drive shaft is provided. The axle assembly may include a first axle unit, a second axle unit, a differential coupled to the first axle unit and the second axle unit therebetween, an axle housing, a drive pinion positioned within the axle housing, a ring gear, a carrier, a differential pinion, a first side gear and a second side gear, a first axle shaft, a second axle shaft, a first bearing, a first bearing support, and a torque sensing assembly. The ring gear is engaged with the drive pinion and is driven by the drive pinion to rotate. The carrier is attached to the ring gear and to rotate with the ring gear. The differential pinion is coupled to the carrier and operable to rotate with the ring gear and to self-rotate about a differential pinion axis. The first side gear and the second side gear are respectively engaged with the differential pinion and driven by the differential pinion. The first axle shaft is coupled to and rotating with the first side gear. The second axle shaft is coupled to and rotating with the second side gear. The first bearing is coupled to the axle housing and rotatable with the carrier. The first bearing support is coupled to the axle housing and used to support the first bearing. The torque sensing assembly includes at least one sensor. The differential housing portion includes a first differential side plate to which the first bearing support is coupled, and the first differential side plate includes a receiving hole extending in a direction from a surface of the differential housing portion toward the first bearing. The receiving hole is configured to receive the sensor operable to measure a characteristic in or below the receiving hole in response to a separation force created between the drive pinion and the ring gear.

A differential of an axle assembly is provided. The differential may include a differential housing portion, a drive pinion positioned within the differential housing portion, a ring gear, a carrier, a differential pinion, a first side gear, a second side gear, a first bearing, a first bearing support, and a torque sensing assembly. The ring gear is engaged with the drive pinion and is driven by the drive pinion to rotate. The carrier is attached to the ring gear and is used to rotate with the ring gear. The differential pinion is coupled to the carrier and operable to rotate with the ring gear and to self-rotate about a differential pinion axis. The first side gear is engaged with the differential pinion and driven by the differential pinion. The first bearing is coupled to the differential housing portion and rotatable with the carrier. The first bearing support is coupled to the differential housing portion and used to support the first bearing. The torque sensing assembly is coupled to at least one of the differential housing portion and the first bearing support. The torque sensing assembly includes at least one sensor. The differential housing portion includes a first differential side plate to which the first bearing support is coupled. The first differential side plate includes a receiving hole extending in a direction from a surface of the differential housing portion toward the first bearing. The receiving hole is used to receive the sensor operable to measure a characteristic in or below the receiving hole in response to a separation force created between the drive pinion and the ring gear.

A drivetrain component is provided. The drivetrain component may include a housing, a driving element positioned within the housing, a driven element engaged with the driving element and driven by the driven element to rotate, a bearing, a bearing support, and a torque sensing assembly. The bearing is coupled to the housing and rotatable with one of the driving element and driven element. The bearing support is coupled to the housing and used to support the bearing. The torque sensing assembly coupled to at least one of the housing portion and the bearing support. The torque sensing assembly includes at least one sensor. The housing includes a side plate or protrusion extending from an inner surface of the housing toward the bearing. The bearing support is coupled to the side plate or the protrusion. The side plate or protrusion includes a receiving hole extending in a direction from an outer surface of the housing toward the bearing. The receiving hole is used to receive the sensor operable to measure a characteristic in or below the receiving hole in response to a separation force created between the driving element and the driven element.

A drivetrain component is provided. The drivetrain component may include a housing having a bearing securing structure, a driving element positioned within the housing, a driven element engaged with the driving element and driven by the driving element to rotate, a bearing, and a torque sensing assembly. The bearing is coupled to the bearing securing structure of the housing and rotatable with one of the driving element and driven element. The torque sensing assembly coupled to at least one of the housing and the bearing support. The torque sensing assembly includes at least one sensor. The housing includes a receiving hole extending in a direction from a surface of the housing toward the bearing. The receiving hole is used to receive the sensor operable to measure a characteristic in or below the receiving hole in response to a separation force created between the driving element and the driven element.

Other features and aspects will become apparent by consideration of the detailed description and accompanying drawings.

BRIEF DESCRIPTION OF THE DRAWINGS

FIG. 6 is a partial cross-sectional view of the axle assembly of FIG. 1 showing two of the third strain gages.

DETAILED DESCRIPTION OF THE DRAWINGS

Figure 1:
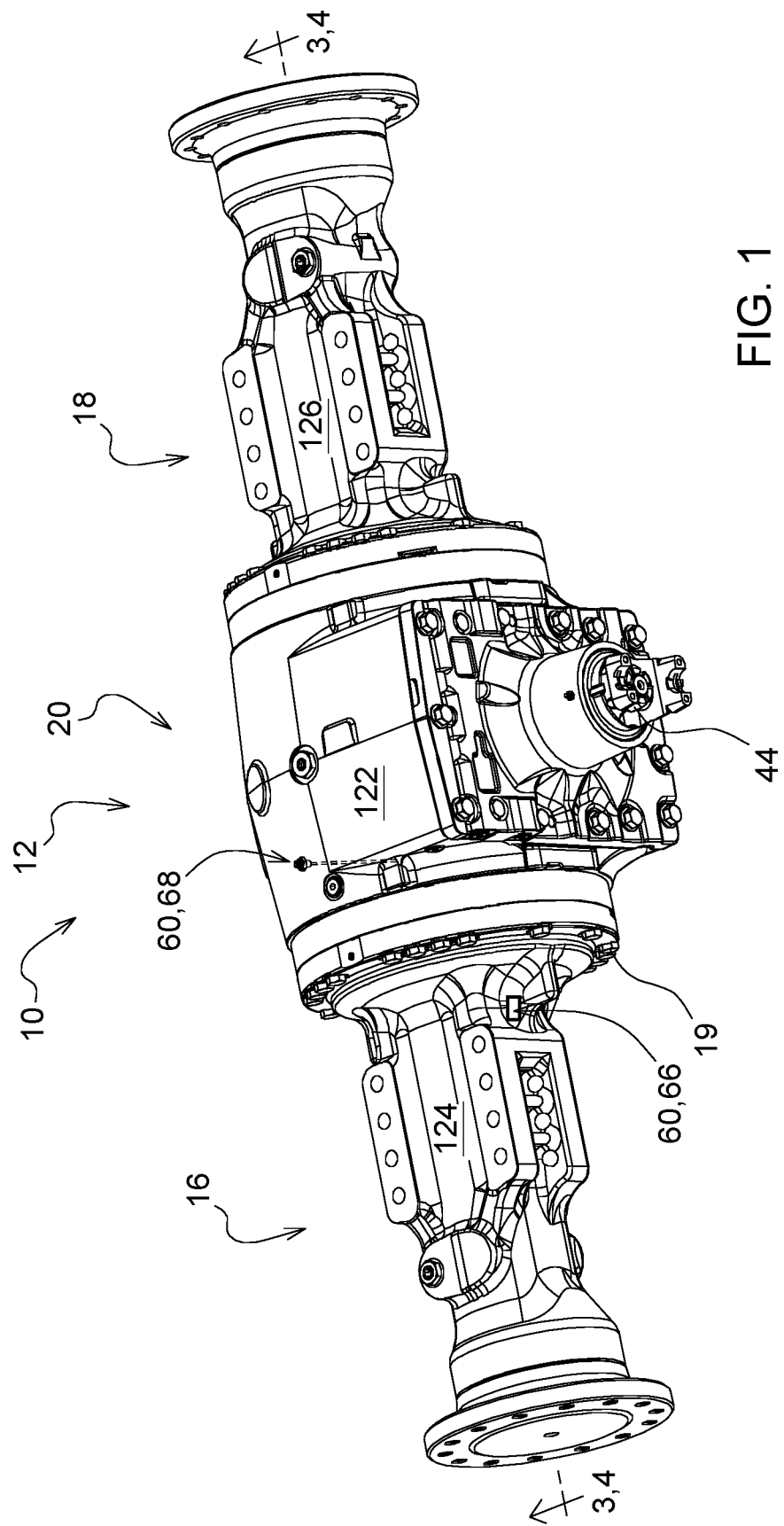
FIG. 1 is schematic perspective view of an axle assembly.

The present disclosure includes a torque sensing assembly having one or more than one strain gages applied on a bearing support of a driveline (drivetrain) component such as a differential, transmission, and other drivetrain component. The differential may be an open (standard) differential, a limited slip differential (LSD), or other type of differential. The strain gages detect the strain on the bearing support and/or other part of the drivetrain and such value may be used by a controller to calculate a torque of a drive shaft (front axle drive shaft, for example), input shaft, output shaft or another component because the strain values detected from certain location of the bearing support or other location of drivetrain housing (transmission housing, axle housing, etc.,) may have a positive correlation with the torque of the drive shaft (axle input torque), input shaft, or output shaft. In particular, the strain and the torque may be in a substantial linear relationship.

The torque sensing assembly may also include at least one sensor. The sensor(s) is coupled to or received by a receiving hole(s) of the drivetrain housing, such that the sensor can measure characteristic(s) in or below the receiving hole. The sensor(s) may be a strain gage or a position sensor. The drivetrain housing may include a side plate (or protrusion) having an aperture to receive a part of the bearing support which further receives the bearing. The side plate or protrusion may extend from the inner surface of the drivetrain housing toward the bearing support or bearing to form the aperture. The receiving hole of the drivetrain is positioned in the side plate (or protrusion), extending from an outer surface the drivetrain housing toward the bearing support or the bearing. When the torque sensing assembly includes the sensor that is a strain gage, the sensor measures the strain in the receiving hole. The strain is created by a separation force between a driving element and a driven element with toothed features, such as the separation force between a ring gear and a drive pinion and the separation force between gears in the transmission. When the torque sensing assembly includes the sensor that is a position sensor, the sensor measures a position (including the movement, distance) in or below the receiving hole caused by the separation force. The position may refer to the position of the bearing support, the bearing, a magnet piece, a metal pin, or the bottom of the receiving hole. The position (movement, distance) and the torque of the driving or driven element may be in a substantial linear relationship or other relationship, such that a controller may calculate the torque based on the measurement of the sensor.

In one implementation, due to geometry of a front axle drive shaft with a drive pinion, and a ring gear, a carrier, a differential pinion(s) (spider gears) attached to the carrier (in this embodiment the number is two), a differential side gear(s) (in this embodiment the number is two), a first bearing, bearing support, etc., the strain gage(s) of torque sensing assembly detect strains caused from a separation load/force. The separation load is resulted from the engagement (or reaction force) between the drive pinion and the ring gear. The detail structure is described below.

As shown in FIGS. 1-3, and 9 a work vehicle 99 includes an axle assembly 10, as an example of a drivetrain component DTC. The work vehicle 99 may include but is not limited to an agricultural equipment such as combine, tractor, harvester, loader, or a construction equipment such as backhoe, dump truck, dozer, excavator, motor grader, scraper, or a forestry equipment such as feller buncher, skidder and skidder. The work vehicle 99 may include any other vehicle having one or more drivetrain components described herein. The axle assembly 10 as shown in FIGS. 1-4 in the present disclosure is a front axle assembly 10 but, in another implementation, it can be rear axle assembly or other axle assembly. The axle assembly 10 in another implementation may be installed at front and rear locations, that is, four-wheel drive. The (front) axle assembly 10 includes an axle housing 12. The front axle assembly 10 may include a first axle unit 16, a second axle unit 18, and a differential 20 coupled to the first axle unit 16 and the second axle unit 18 therebetween via bolts 19. The first axle unit 16 has a first axle shaft 162 and the second axle unit 18 has a second axle shaft 182. The first axle shaft 162 and the second axle shaft 182 are respectively coupled to a portion of ground engaging unit, such as wheel rim (not shown). The axle housing 12 of the axle assembly 10 includes a differential housing portion 122 of the differential 20, a first housing portion 124 of the first axle unit 16, a second housing portion 126 of the second axle unit 18. The axle housing 12 is operable to receive variable driveline components such as differential case, gears, shafts, which will be described later.

Figure 3:
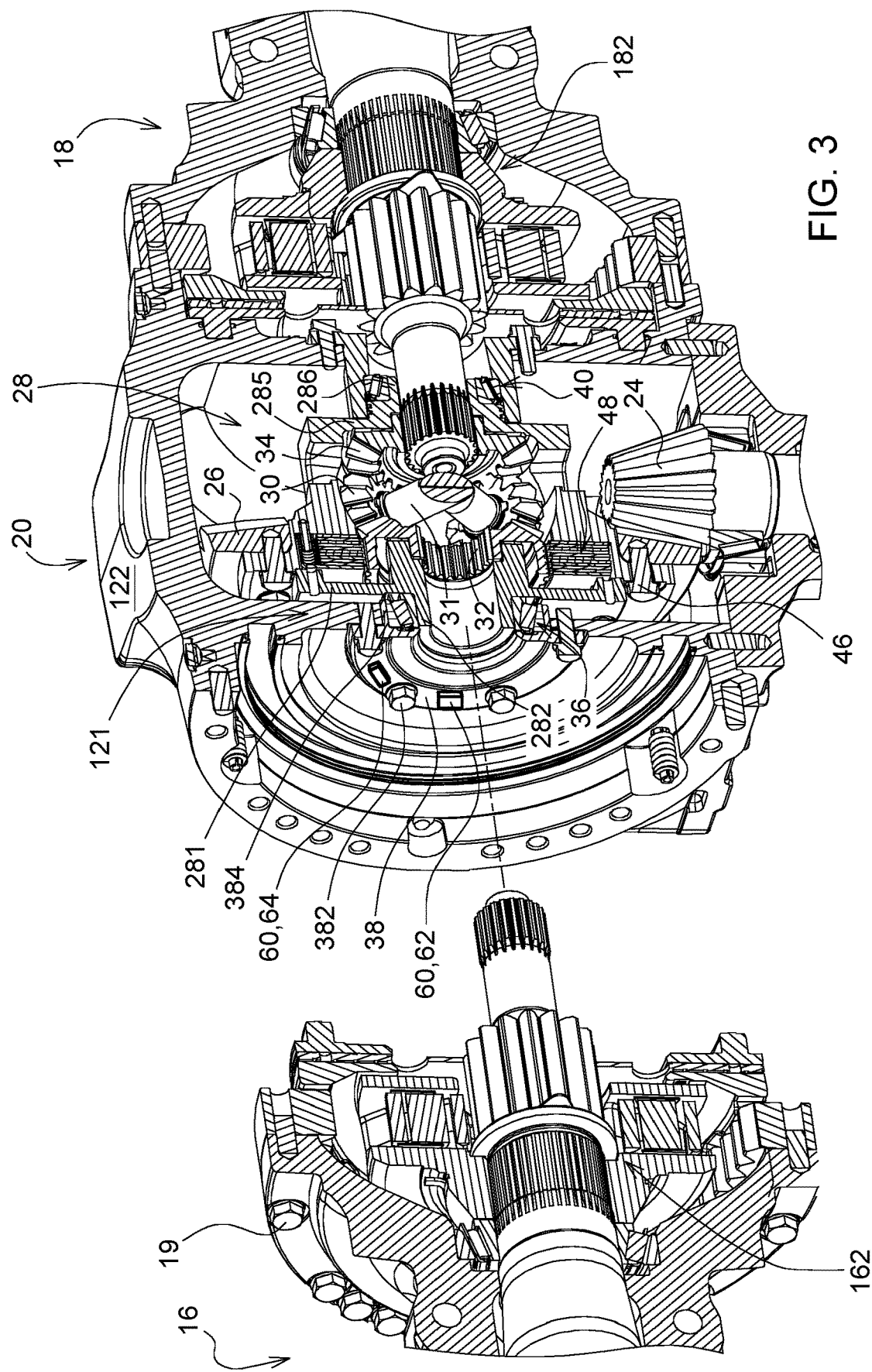
FIG. 3 is an exploded cross-sectional perspective view of the axle assembly of FIG. 1.
Figure 4:
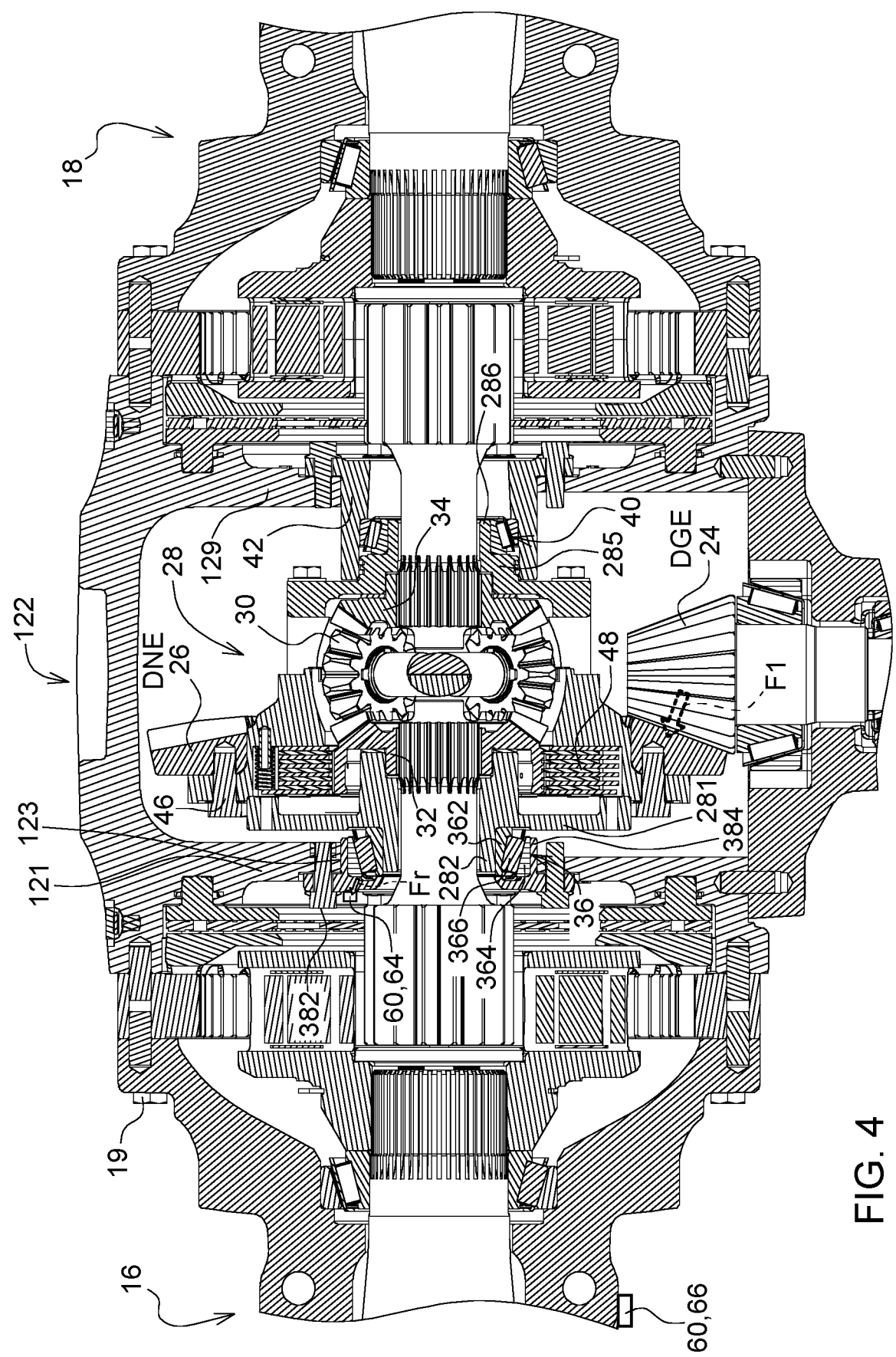
FIG. 4 is an exploded cross-sectional view of the axle assembly of FIG. 1.

As shown in FIGS. 3 and 4, the differential 20 coupled to a drive shaft (not shown) may include, but is not limited to an axle housing 12 (an example of a drivetrain housing DTH), a drive pinion 24, a ring gear 26, a differential case (carrier) 28, differential pinions (gears) 30, a first side gear 32, a second side gear 34, a first bearing 36, a first bearing support 38, a second bearing 40, and a second bearing support 42. The numbers of aforementioned elements are illustrated only for demonstrative purpose in implementations. The drive pinion 24 is normally coupled to the (front axle) drive shaft (not shown) via a universal joint 44 (shown in FIG. 1). As shown in FIG. 3, the drive pinion 24 is positioned within the axle housing 12. The ring gear 26 is engaged (meshed) with the drive pinion (pinion gear) 24 and is driven by the drive pinion 24 to rotate. The ring gear 26 is a spiral bevel ring gear. The carrier 28 attaches to the ring gear 26 so as to rotate with the ring gear 26. In this embodiment, the carrier 28 is fixed to the ring gear 26 via bolts 46. Within the carrier 28, two differential pins 31, each of which holds a pair of differential pinion(s) 30 (only one differential pinion 30 of each pair of differential pinion 30 are shown in FIG. 3), such that the differential pinions 30 can rotate with the ring gear 26. In addition, the differential pinions 30 can self-rotate about its own differential pinion axis. While the differential pinions 30 rotate and/or self-rotate, they engage with or crawl over the first side gear 32 and/or the second side gear 34 and therefore the first side gear 32 and the second side gear 34 (differential side gears) can rotate independently from the carrier 28. In this regard, when the work vehicle 99 having the differential 20 steers to the left or right, one of the first side gear 32 or the second side gear 34 can ensure the outer wheel or other outer ground engaging unit rotate faster than the inner wheel or other inner ground engaging unit. The power (or torque from the front axle drive shaft) can be transferred through the drive pinion 24, the ring gear 26, the carrier 28 (and clutch plates 48 inside the carrier 28), the differential pinions 30, the first side gear 32 and/or the second side gear 34, and eventually to the first axle unit 16 coupled to the first side gear 32 and/or a second axle unit 18 coupled to the second side gear 34. In this embodiment, a distance in a lateral direction between the first side gear 32 and the ring gear 26 is closer than a distance in the lateral direction between the second side gear 34 and the ring gear 26.

As shown in FIGS. 3 and 4, there are a first bearing 36 and a second bearing 40 applied on different sides of the carrier 28. A distance in the lateral direction between the first bearing 36 and the ring gear 26 is closer than a distance in the lateral direction between the second bearing 40 and the ring gear 26. A first side 281 of carrier 28 protrudes a first inner ring portion 282 (toward a first wheel, not shown) and a second 285 side of the carrier protrudes a second inner ring portion 286 (toward a second wheel, not shown). As to the first bearing 36, shown in FIG. 4, it has a first inner race 362, a first outer race 364 (first bearing cup), and rolling elements 366 (such as rollers) between the first inner race 362 and the first outer race 364. The first inner race 362 is coupled to the first inner ring portion 282 and is configured to rotate with the carrier 28. The rolling elements 366 are coupled to the first inner race 362 and configured to roll in response to the rotation of the first inner race 362. The first outer race 364, which the rolling elements 366 roll relative to, is fixed to a first bearing support 38 (quill). The first bearing support 38 (quill) is coupled to the differential housing portion 122 of the axle housing 12 and is configured to support the first bearing 36. As shown in FIG. 4, a body of the first bearing support 38 is positioned on the left of the first bearing 36 to prevent the first bearing 36 from moving out of the differential 20. The differential housing portion 122 includes a first differential side plate 121 and a second differential side plate 129, and the carrier 28 is positioned therebetween. The first bearing support 38 is coupled to the first differential side plate 121 by fasteners 382, which are bolts in this implementation. The first bearing support 38 protrudes a first outer ring portion 384 coupled to the first outer race 364 and is parallel to the first inner ring portion 282 of the carrier 28 in this embodiment. The first bearing 36 is sandwiched by the first inner ring portion 282 of the carrier 28 and the first outer ring portion 384 of the first bearing support 38. The first differential side plate 121 includes an aperture 123. The first outer ring portion 384 of the first bearing support 38 and the aperture 123 are press-fit.

In this embodiment, a torque sensing assembly 60 is applied on the first bearing support 38. However, in another embodiment the torque sensing assembly (not shown) can be applied on the second bearing support 42. In another variation, both of the first bearing support 38 and the second bearing support 42 may be installed with one or more than one torque sensing assemblies 60. The strain gages of the torque sensing assemblies 60, as shown in the following implementations, may be located at or in bearing containment elements like bearing support member(s) that deflect under strain when loaded. These strain gages thus create strain signals that are caused by gear separation forces proportional to drivetrain torque. Because the strain gages may be positioned on or adjacent to the bearing and the bearing support, at which the gear separation forces of interest may be located, the strain measurements are thus less influenced by vehicle structural loads.

Figure 5:
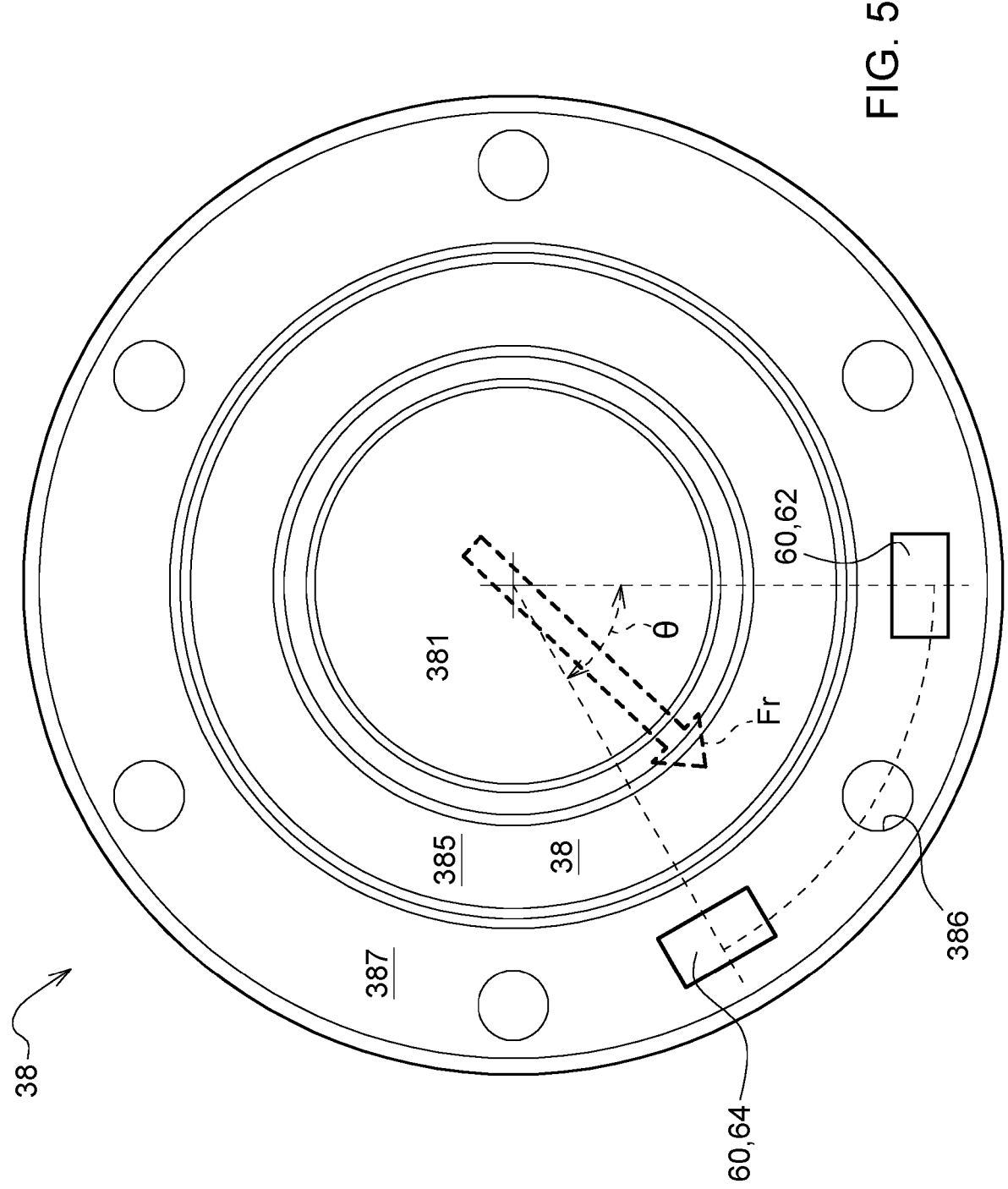
FIG. 5 is a front view of a first bearing support having a first and a second strain gages shown in FIGS. 3 and 4.

Referring to FIGS. 4 and 5, in this embodiment, the torque sensing assembly 60 includes a first strain gage 62 and a second strain gage 64 positioned on the first bearing support 38. A first radial direction from a center of the first bearing support 38 toward the first strain gage 62 and a second radial direction from the center of the first bearing support 38 toward the second strain gage 64 forming an angle θ smaller than or equal to 60 degrees, for example. In another embodiment, the angle can be different degrees. As shown in FIG. 5, the first bearing support 38 in this embodiment has an axle hole 381 through which the first axle shaft 162 passes through. The first bearing support 38 may have an inner support portion 385 adjacent to the axle hole 381 and may have an outer support portion 387, which is a flange or flatform from the inner support portion 385. The inner support portion 385 and the outer support portion 387 form a step therebetween. In this embodiment, the outer support portion 387 of the first bearing support 38 include multiple holes 386. There are multiple fasteners 382 as mentioned previously, couple the first bearing support 38 to the first differential side plate 121 of the differential housing portion 122 through the holes 386 of the outer support portion 387. In this embodiment, the first strain gage 62 and the second strain gage 64 are positioned on the outer support portion 387 of the first bearing support 38. One of the fasteners 382 is positioned between the first strain gage 62 and the second strain gage 64. The first strain gage 62, the fastener 382, and the second strain gage 64 are on a circular arc. The first strain gage 62 and the second strain gage 64 are at the end of the circular arc. The fastener is positioned in the middle of the circular arc but in another embodiment, it does not have to be in the middle.

In variation, there are more than one fastener aligned in the same arc between the first strain gage 62 and the second strain gage 64.

In variation, there is only one strain gage or more than two strain gages applied on the outer support portion and/or the inner support portion. In variation, no or not all the strain gages are required to position on the same circular arc.

In this embodiment, the holes 386 on the outer support portion 387 of the first bearing support 38 spaced apart equally. For the strain measurement purpose, the distance of holes 386 may be different in another embodiment. For example, a hole (if there is only one) between the first strain gage 62 and the second strain gage 64 is defined as a unique hole. A distance between the adjacent regular hole is longer than a distance between two adjacent regular holes (not shown). For another embodiment, there is no hole between the first strain gage 62 and the second strain gage 64 but a distance between a hole adjacent to the first strain gage 62 and another hole adjacent to the second strain gage 64 is longer than a distance between two other adjacent regular holes. In variation, the fastener (if only one) between the first stain gage 62 and the second strain gage 64 may be different from other fastener, which could be smaller or more flexible; the hole corresponding to that fastener may corresponding to the size of the fastener.

In another embodiment, the first bearing support 38 is coupled to the first differential side plate 121 of the differential housing portion 122 by other means.

In another embodiment, the first bearing support 38 may additionally include different type of hole(s)/aperture(s) for receiving torque sensor assembly 60 such as the first strain gage 62 and the second strain gage 64. Such hole(s) can be a blind hole(s) or through hole(s). The torque sensor assembly 60 (the first strain gage 62 or the second strain gage 64) may include a holder attaching to the wall of the hole. The holder may be press-fit to the hole. The torque sensor assembly may also include a sleeve corresponding and attached to a holder inner surface. One or more than one strain sensors is/are attached to the sleeve and configured to detect a strain of the first bearing support resulted from the separation force between the drive pinion and the ring gear. Optionally, the sleeve is a flexible printed circuit board electrically coupled to the plurality of strain gages via traces.

Figure 9:
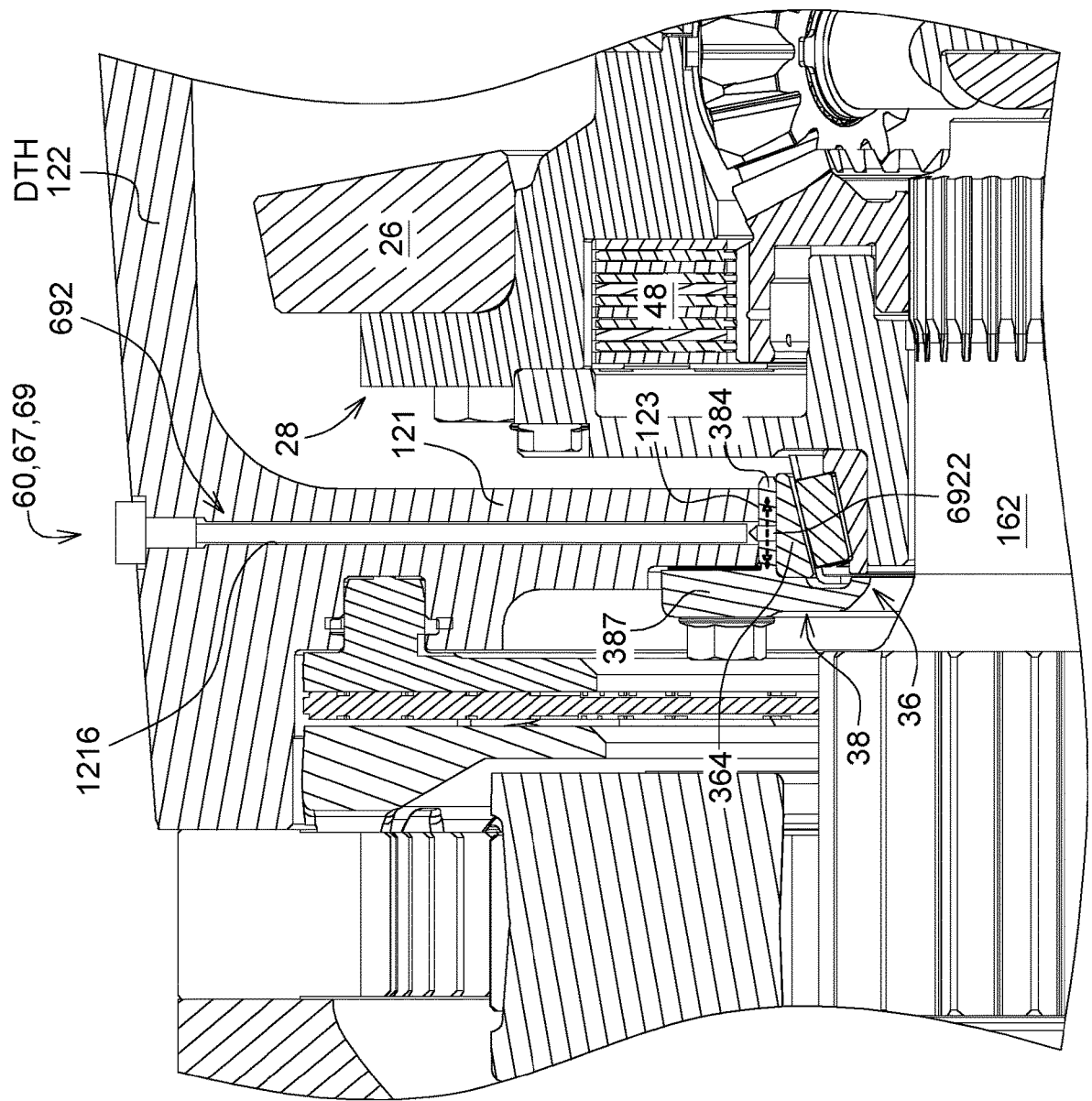
FIG. 9 is a partial cross-sectional view of the differential housing portion that receives the first position sensor having a position sensor pin in one implementation.

As shown in FIGS. 3 and 4, when the drive pinion 24 rotates, a separation force F1 caused by the rotation of the (spiral bevel) drive pinion 24 and ring gear 26 is created. A resultant gear separation force Fr, the magnitude of which may be proportional to the separation force F1 between the drive pinion 24 and the ring gear 26, transmits to the first bearing support 38. The torque sensor assembly 60, such as the first strain gage 62 and/or the second strain gage 64, therefore detects the strain cause by resultant gear force Fr. As shown in FIG. 9, a controller 90 of a work vehicle 99 having the axial assembly 10 may receive the strain signals from the torque sensor assembly 60 such as the first strain gage 62, the second strain gage 64, a third strain gage 66, and/or at least one sensor 67 that may include a fourth strain gage 68, to calculate the axle input torque due to the correlation based on geometry. The third strain gage 66 and the fourth strain gage 68 will be introduced in the later description.

The number of the third strain gage 66 can be one or more than one. FIGS. 1 and 4 demonstrate one third strain gage 66; FIG. 6 demonstrates two third strain gages 66. The third strain gage(s) 66 is coupled to a first housing portion 124 of the first axle unit 16 and operable to measure the strain of the first housing portion 124 when the first axle unit 16 is in operation. As shown in FIG. 6, a deflection in the first housing portion 124 may be proportional to the axle input torque due to the reaction of the traction forces F2 from the tires/wheels, and a crowd force therefore applied on the axle unit 16. This deflection DL can be monitored with the third strain gages 66. The resulting output of the third strain gage 66 may be directly proportional to axle input torque.

Figure 7A:
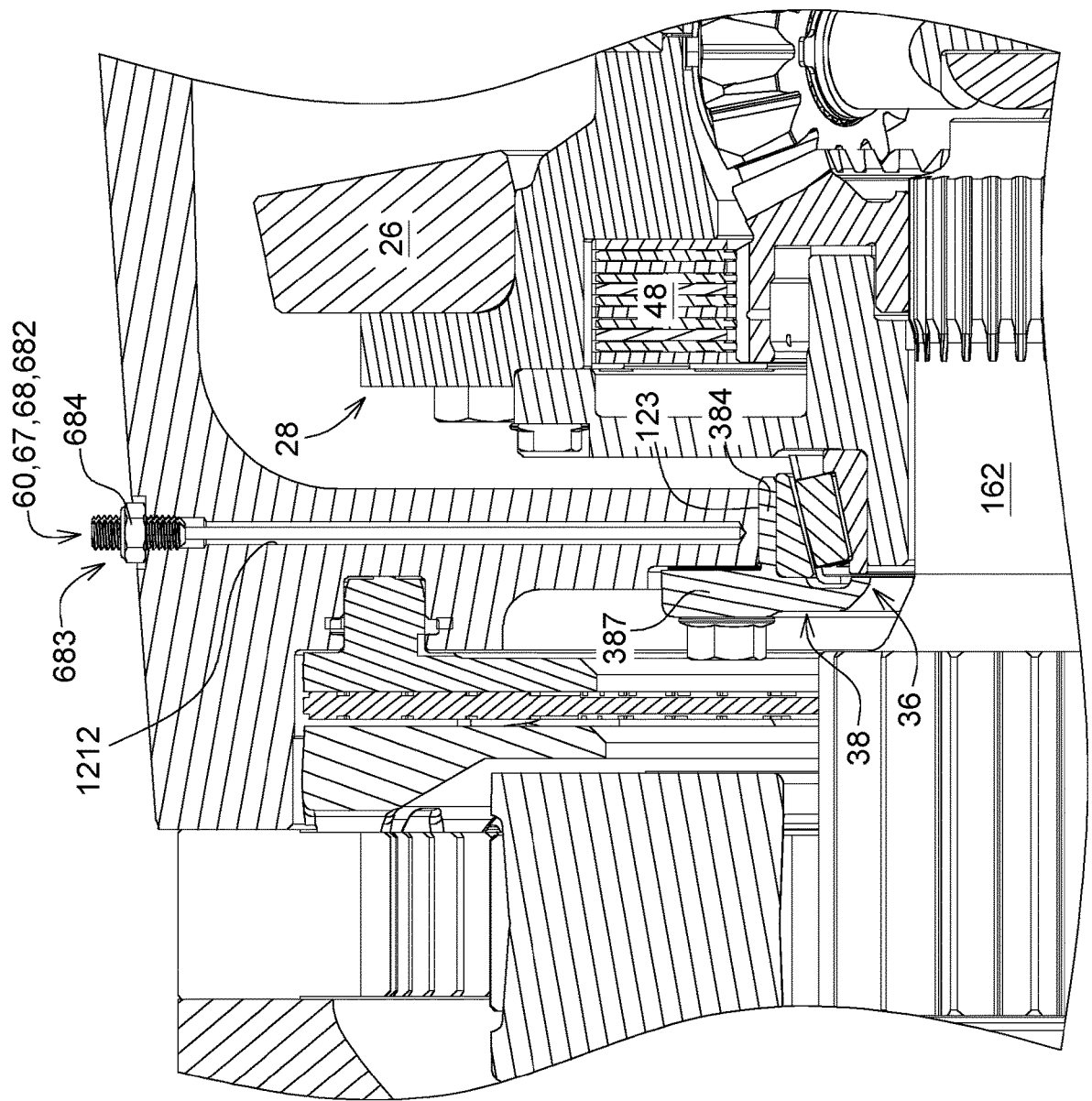
FIG. 7A is a cross-sectional view of a differential housing portion that receives a fourth strain gage having a strain gaged pin in one implementation.
Figure 7B:
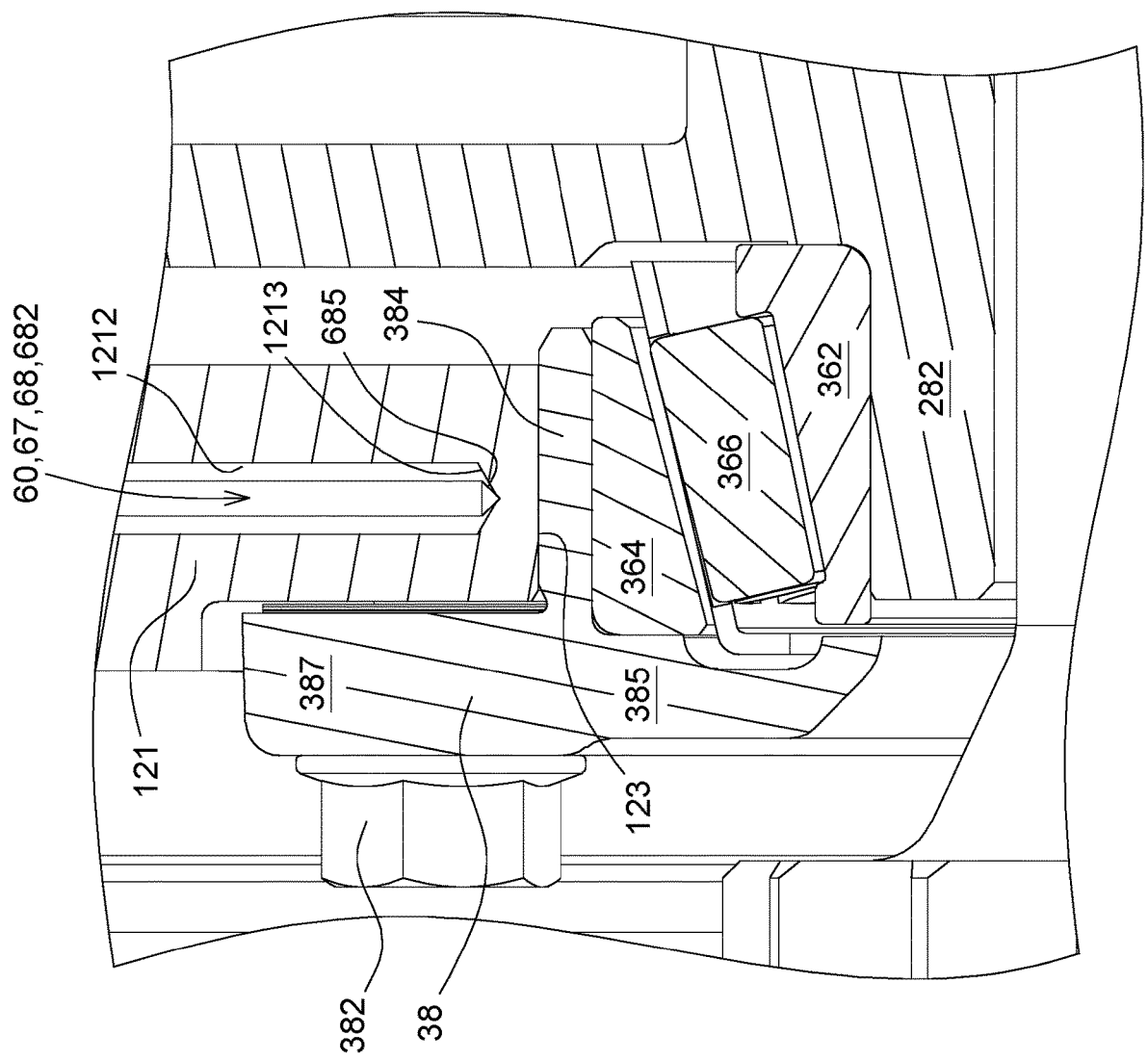
FIG. 7B is an enlarged cross-sectional view of the differential housing portion that receives the fourth strain gage of FIG. 7A.
Figure 8:
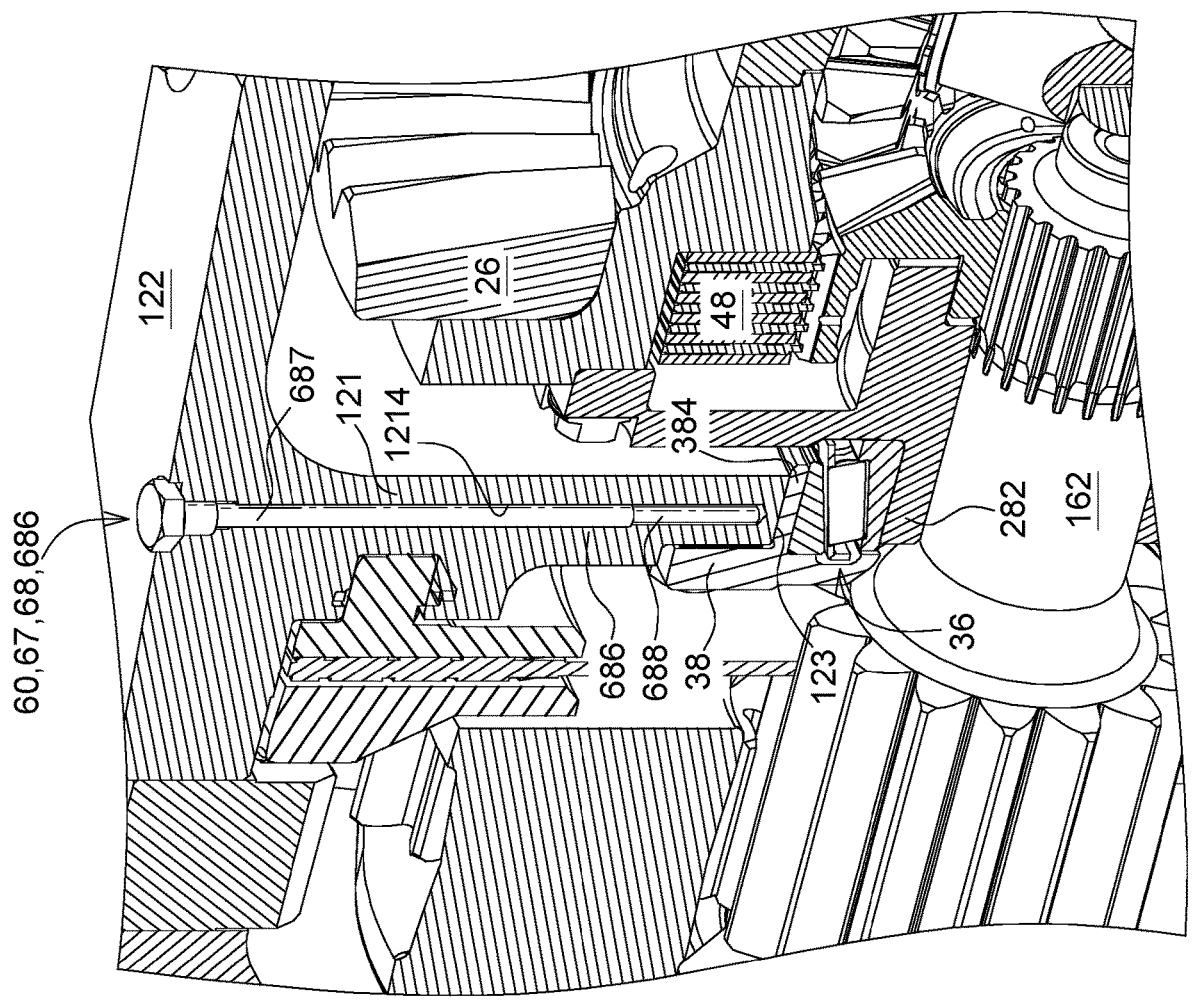
FIG. 8 is a partial cross-sectional view of the differential housing portion that receives the fourth strain gage having a strain gaged pin in another implementation.

With regard to at least one sensor 67, it is coupled to or received by a receiving hole(s) 1212, 1214, 1216, 1218, and/or 1220 of the drivetrain housing DTH. Referring to FIGS. 7A, 7B, and 8, the fourth stain gage 68 of the sensor 67 of the torque sensing assembly 60 is introduced. The first differential side plate 121 of the differential housing portion 122 includes a receiving hole 1212 (receiving hole 1214 in FIG. 8) extending in a radial direction from a surface the differential housing portion 122 toward the first bearing 36. The bottom 1213 of the receiving hole 1212 is adjacent to the aperture 123 of the first differential side plate 121. The receiving hole (1212 or 1214) is configured to receive the fourth strain gage 68 which includes a strain gaged pin (682 or 686) operable to measure the strain in the receiving hole (1212 or 1214) of the first differential side plate 121 resulted from the separation force F1. The fourth stain gage 68 of the sensor 67 includes a body extending along the receiving hole (1212 or 1214). Because the first outer ring portion 384 of the first bearing support 38 abuts aperture 123 (press-fit) and the outer support portion 387 of the first bearing support 38 overlap with a lower portion of the receiving hole (1212, 1214) in a radial direction relative to the center of the axle hole 381 of the first bearing support 38, a resultant force may be easily transmitted to the receiving hole (1212, 1214) causing a deflection thereof and benefits the measurement of the strain detected by the fourth strain gage 68.

Figure 2:
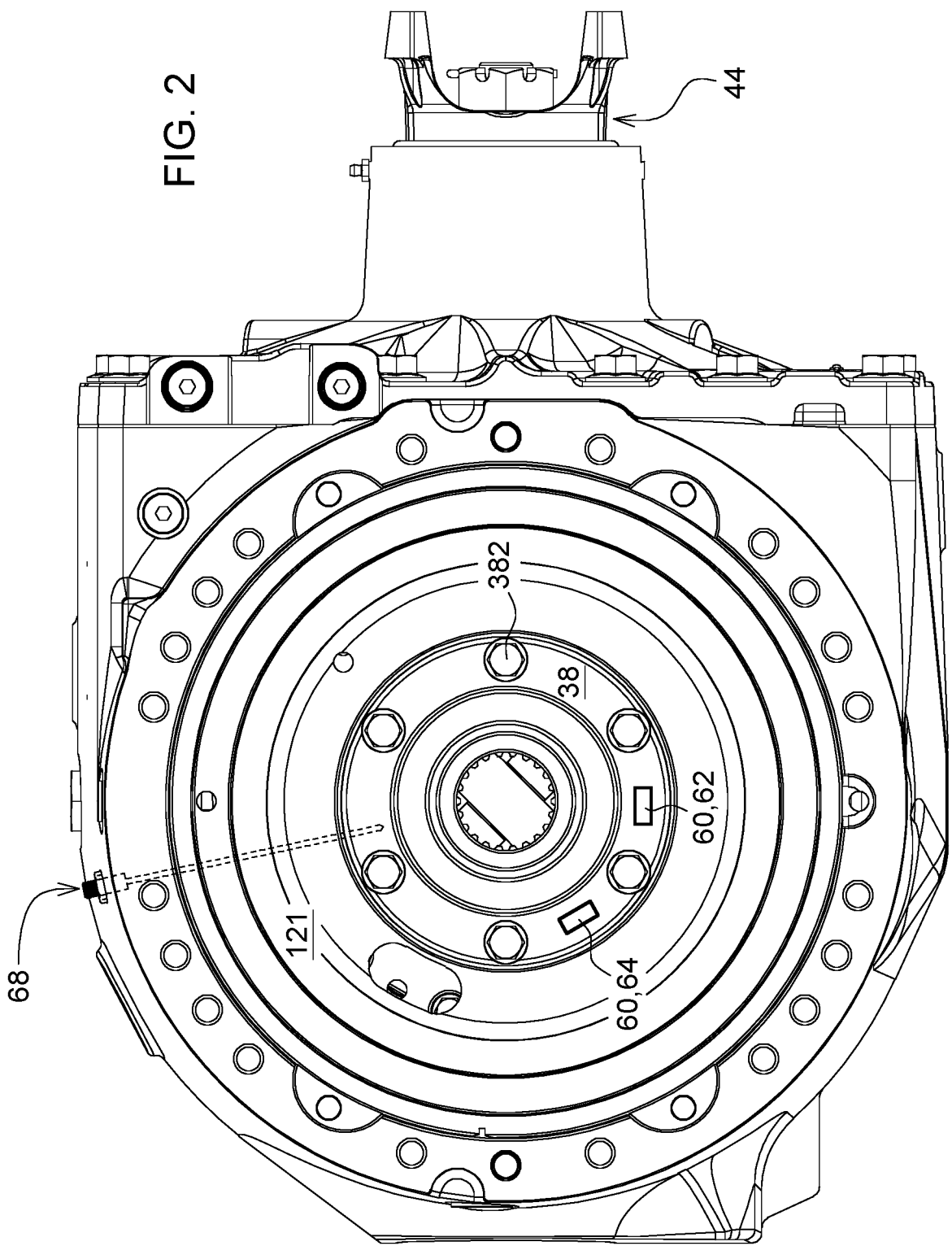
FIG. 2 is side view of a differential of the axle assembly with a first axle unit removed.

In one implementation, as shown in FIGS. 2, 7A and 7B, the fourth strain gage 68 includes a strain gaged pin 682. The strain gaged pin 682 includes a fastener 683 coupling a body of the strain gaged pin 682 to the differential housing portion 122. The fastener 683 may include a threaded feature coupled to a threaded upper portion of the receiving hole 1212 and a nut 684 coupled to the threaded feature. A sensing portion 685 of the strain gaged pin 682, which is bottom of the body of the strain gaged pin 682 in this implementation, engages the bottom 1213 of the receiving hole 1212 to measure the strain thereof. The sensing portion 685 cooperates with the fastener 683 to provide an axial preload relative to the body of the strain gaged pin 682. The axial preload can be consistent and is adjustable by the nut 684 of fastener 683. The consistent axial preload on the strain gaged pin 682 can ensure that the strain gaged pin 682 measures the strain accurately.

Referring to FIG. 8, the fourth strain gage 68 includes a strain gaged pin 686. The strain gaged pin 686 and the receiving hole 1214 are press-fit, which may also provide an axial preload. The configuration of the receiving hole 1214 is corresponding to that of the strain gaged pin 686. The strain gaged pin 686 includes an upper portion 687 and a lower portion 688 coupled to the upper portion 687. The lower portion 688 has a smaller diameter than does the upper portion 687 and operable to measure the strain in the receiving hole 1212. It is noted that the lower portion 688 of the strain gaged pin 686 has a press fit into a lower portion of the receiving hole 1212, which is an active area of the differential housing portion 122 for strain measurement.

FIGS. 9-12 illustrate the sensors 67 including position sensors 69 coupled to a type of the drivetrain housing DTH, such as the differential housing portion 122 and/or transmission housing 82.

Referring to FIG. 9, each position sensor 69 includes a first position sensor 692, having a body (position sensor pin) extending along the receiving hole 1216. The torque sensing assembly 60 also includes a magnet piece 6922, functioned as a target, coupled to one of the first bearing support 38 and the first outer race 364 of the first bearing 36. In this implementation, the magnet piece 6922 is embedded on the first outer ring portion 384 of the first bearing support 38. The magnet piece 6922 is located under and corresponding to the receiving hole 1216 of the first differential side plate 121. It is noted that the magnet piece 6922 located under (or below) the receiving hole 1216 means that the magnet piece 6922 is closer to the first axle shaft 162 than is the bottom of the receiving hole 1216 in a radial direction; in another implementation the receiving hole 1216 drilled or taped from an opposite side of the drivetrain housing DTH may still has the magnet piece 6922 under the receiving hole 1216. The receiving hole 1216 is a through hole to expose the magnet piece 6922 to a bottom of the body of the first position sensor 692. In addition, the first position sensor 692 may be coupled to the upper portion of the receiving hole 1216 adjacent to the outer surface of the differential housing portion 122 with fastener such as threaded or press-fit feature.

The first position sensor 692 is operable to measure a characteristic in or below the receiving hole 1216 in response to the separation force F created between the driving element DGE (e.g., drive pinion 24) and the driven element DNE (e.g., ring gear 26). The characteristic herein includes a position of the magnet piece 6922 relative to the first position sensor 692. The magnet piece 6922 is moveable, in an axial direction, with the first bearing support 38 in response to the separation force F. In another implementation, if the magnet piece 6922 is embedded on the first outer race 364 of the first bearing 36, the magnet piece 6922 is moveable with the first bearing 36 in response to the separation force F. Because the magnet piece 6922 is moved, the magnitude of magnetic field thereof is changed and detected by the first position sensor 692, which can be a Hall effect sensor. The signal indicative of the position of the magnet piece 6922 relative to the first position sensor 692 will be transmitted from the first position sensor 692 to a controller to calculate the torque of the driving element DGE, which is described later. Optionally, the first position sensor 692 may be a retrofittable sensor. The drilled or tapped receiving hole 1216 and the magnet piece 6922 can be prepared during the manufacturing process, and the first position sensor 692 can be installed or replace the previous one later.

Figure 10A:
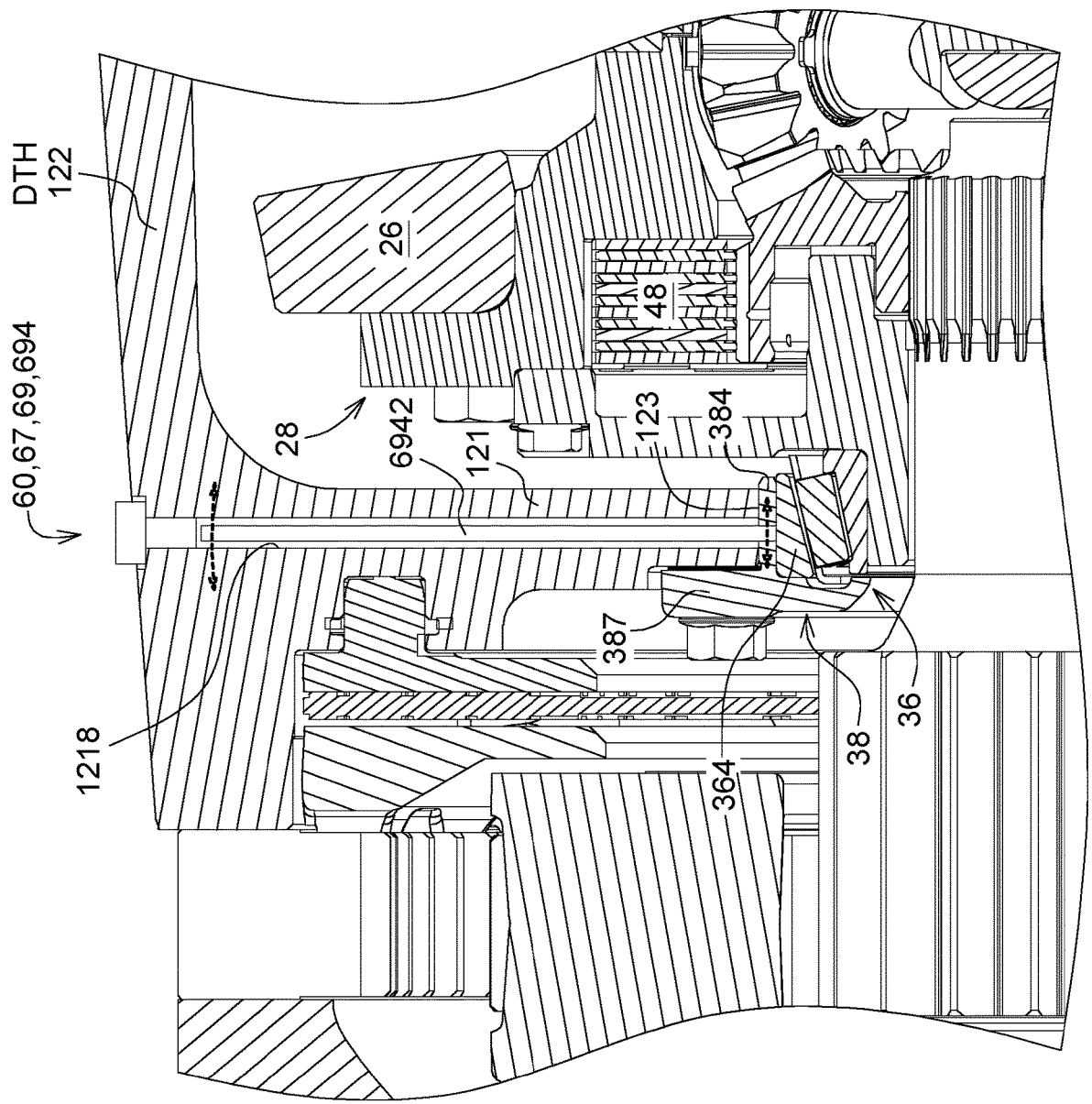
FIG. 10A is a partial cross-sectional view of the differential housing portion that receives the second position sensor measuring a swingable pin in one implementation.
Figure 10B:
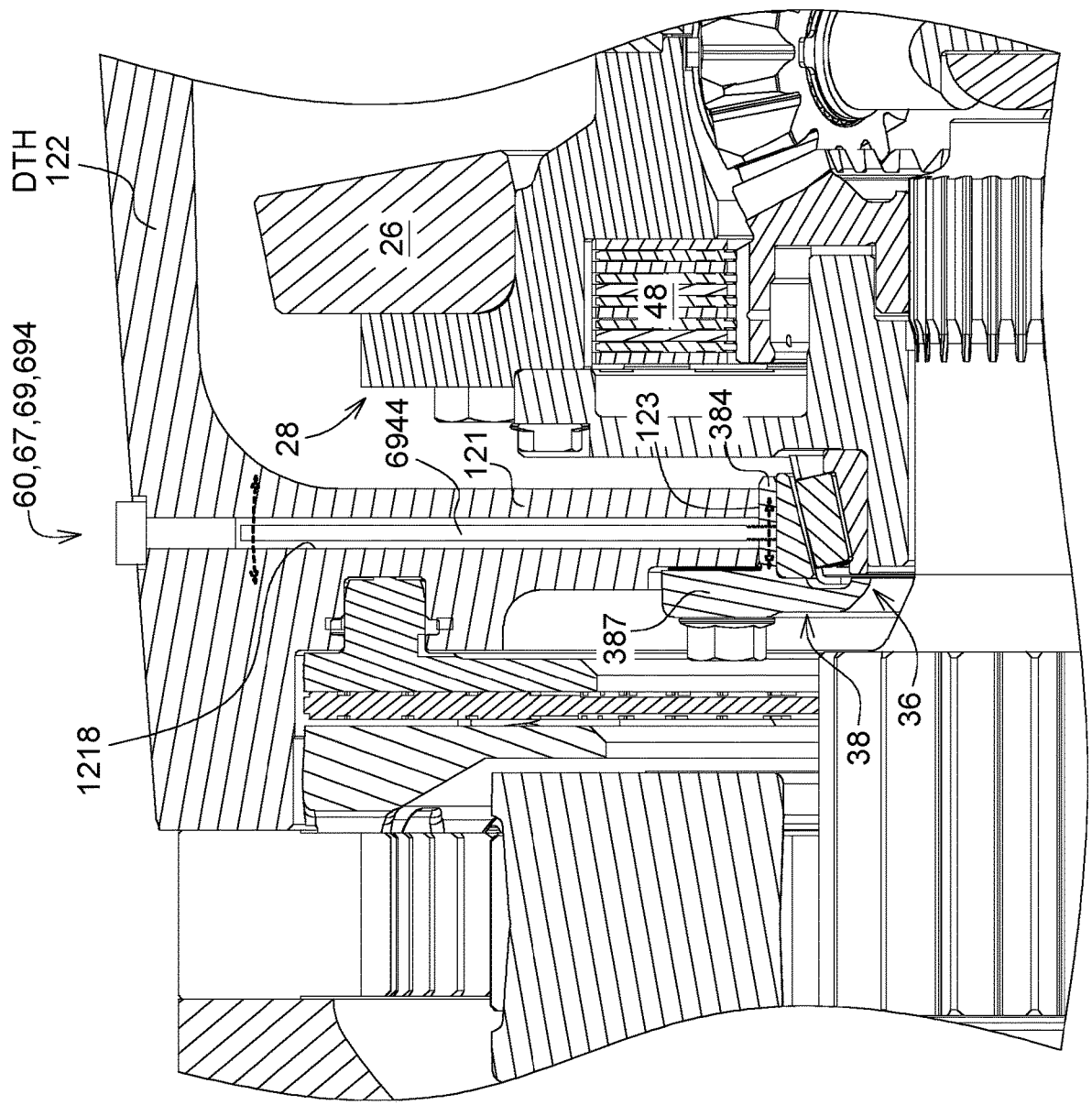
FIG. 10B is a partial cross-sectional view of the differential housing portion that receives the second position sensor measuring another swingable pin in another implementation.

Referring to FIGS. 10A and 10B, the torque sensing assembly 60 comprises a second position sensor 694 (e.g., another Hall effect sensor) and a pin 6942 or 6944 extending along a receiving hole 1218. The pin 6942 or 6944 includes a lower portion coupled to the first bearing support 38 (or coupled to the first outer race 364 of the first bearing 36, in another implementation). In FIG. 10A, at least one of the first bearing support 38 and the first outer race 364 of the first bearing 36 may include a bore, and the lower portion of the pin 6942 and the bore are press-fit. In the implementation shown in FIG. 10A, the first bearing support 38 has the bore; the bottom of the pin 6942 is inserted into the bore of the first bearing support 38 and contacts the first outer race 364 of the first bearing 36. In FIG. 10B, the lower portion of the pin 6944 is threaded, and at least one of the first bearing support 38 and the first outer race 364 of the first bearing 36 may include a threaded bore configured to receive and secure the lower portion of the pin 6944. The top of the pin 6942 or 6944 is a free end and therefore is moveable/swingable in the receiving hole 1218. The wall surrounded the receiving hole 1218 of the first differential side plate 121 and the pin 6942 or 6944 are spaced apart for clearance, such that the pin 6942 or 6944 can move or swing within the receiving hole 1218 without contacting the wall surrounded the receiving hole 1218.

The second position sensor 694 is also operable to measure a characteristic in or below the receiving hole 1218 in response to the separation force F created between the driving element DGE (e.g., drive pinion 24) and the driven element DNE (e.g., ring gear 26). The characteristic herein includes a position of the pin 6942 or 6944 relative to the second position sensor 694. The second position sensor 694 may measure the position of a top of the pin 6942 or 6944 moveable in response to the separation force F. In FIGS. 10A and 10B, the second position sensor 694 may include a magnet (not shown) in its lower portion, and the bottom of the second position sensor 694 is adjacent to the top of the pin 6942 or 6944 with a small gap in the radial direction for measuring the position of the top of the pin 6942 or 6944, which is made of metal. In another implementation, a magnet is attached on the top of the pin 6942 or 6944, functioned as a target, and the second position sensor is not equipped with a magnet at the bottom thereof (not shown). Optionally, the second position sensor 694 may be a retrofittable sensor. The drilled or tapped receiving hole 1218 and the pin 6942 or 6944 can be prepared during the manufacturing process, and the second position sensor 694 can be installed or replace the previous one later.

Figure 11A:
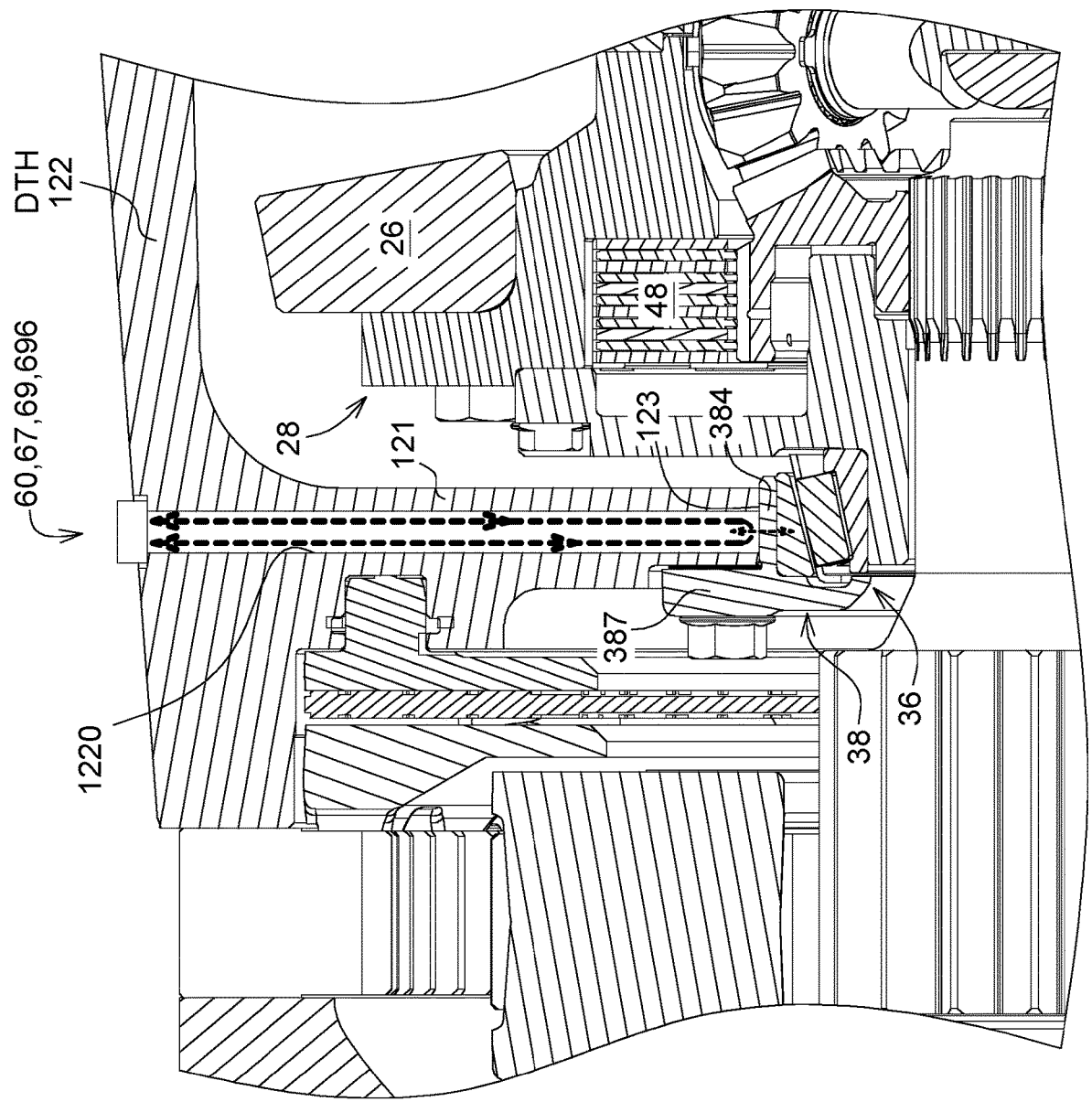
FIG. 11A is a partial cross-sectional view of the differential housing portion that receives the third position sensor measuring the distance between the third position sensor and a first bearing support in one implementation.
Figure 11B:
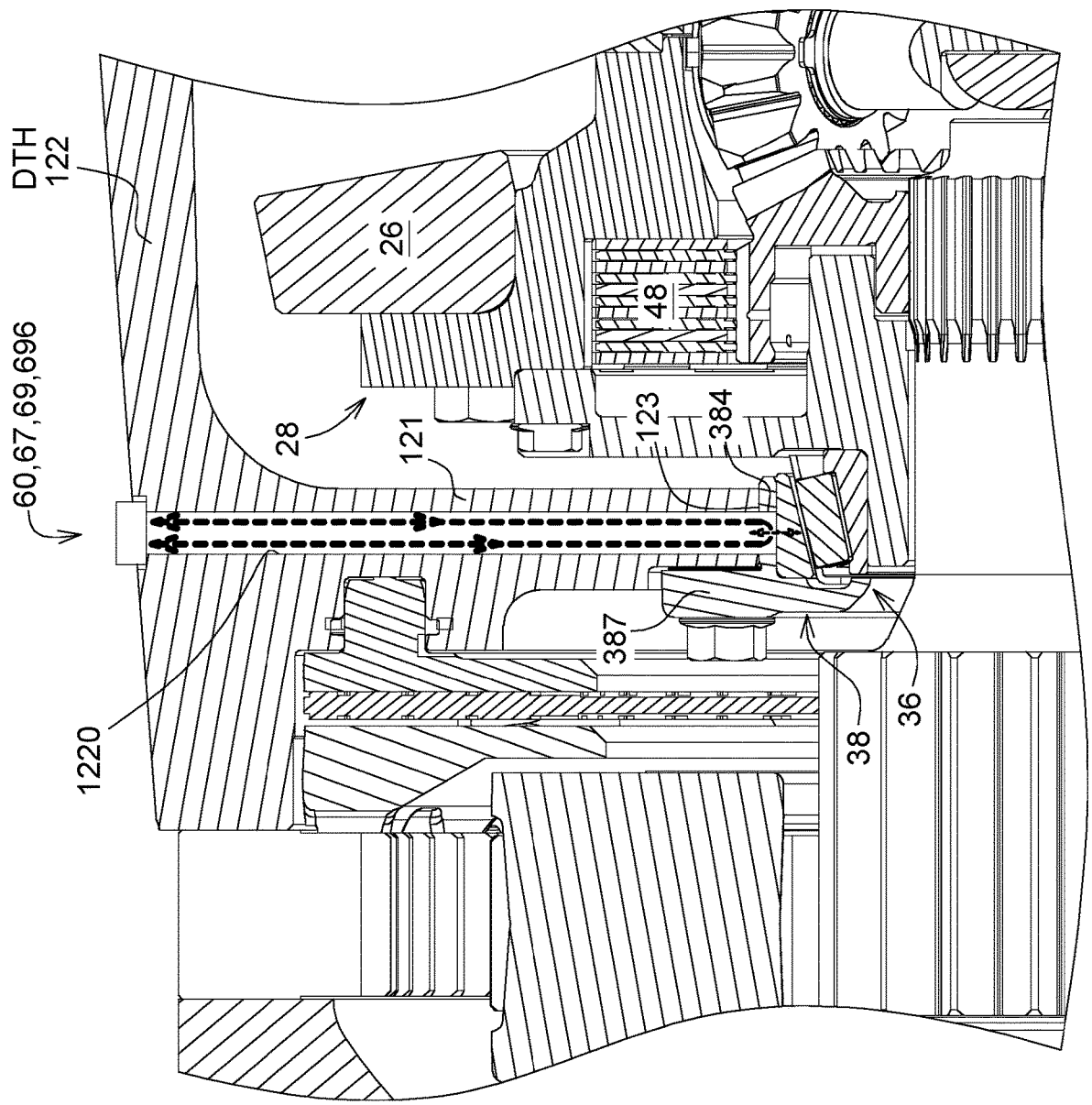
FIG. 11B is a partial cross-sectional view of the differential housing portion that receives the third position sensor measuring the distance between the third position sensor and a first bearing in one implementation.

Referring to FIGS. 11A and 11B, the torque sensing assembly 60 comprises a third position sensor 696 operable to measure a characteristic in or below the receiving hole 1220 in response to the separation force F created between the driving element DGE (e.g., drive pinion 24) and the driven element DNE (e.g., ring gear 26). The characteristic herein includes a distance in the radial direction between the third position sensor 696 and the first bearing support 38 or first bearing 36 below the receiving hole 1220. The third position sensor 696 may be an ultrasonic sensor measuring the distance based on the signal time of the flight (the time frame begins at emitting a sound wave and ends at receiving the echo.) In another implementation, the third position sensor 696 may be an infrared distance sensor (not shown) that measures the distance based on the angle of the reflection. The third position sensor 696 can be other types of position sensors that measures the distance or the position of the first bearing support 38 or first bearing 36.

In FIG. 11A, the receiving hole 1220 is a through hole exposing a portion (first outer ring portion 384) of the first bearing support 38. The third position sensor 696 is configured to measure the distance between the third position sensor 696 and the portion of the first bearing support 38. The distance is changeable in the radial direction in response to the separation force F. In FIG. 11B, the receiving hole 1220 is a through hole, and the first bearing support 38 includes a bore positioned under and corresponding to the through hole so as to expose a portion (first outer race 364) of the first bearing 36. The third position sensor 696 is configured to measure the distance between the third position sensor 696 and the portion of the first bearing 36. The distance is changeable in response to the separation force F. In another implementation, the receiving hole is a blind hole (not shown), the third position sensor 696 is configured to measure a distance between the sensor and a bottom of a receiving hole. The distance is changeable in response to the separation force F. Optionally, the third position sensor 696 may be a retrofittable sensor. The drilled or tapped receiving hole 1220, the bore of the bearing support 38 can be prepared during the manufacturing process, and the third position sensor 696 can be installed or replace the previous one later.

Figure 12:
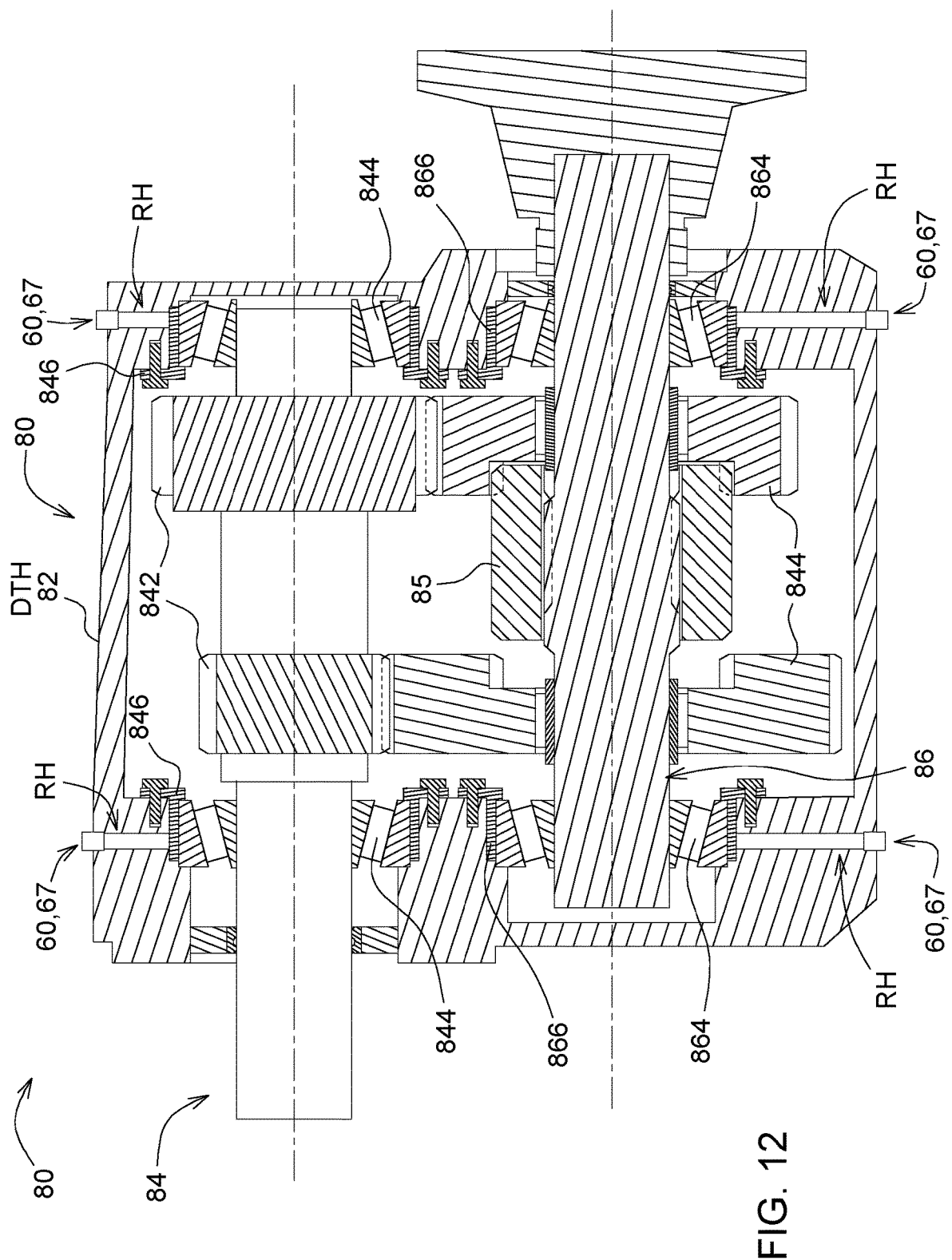
FIG. 12A is a cross-sectional view of a simplified transmission housing having receiving holes to receive at least one type of the sensors illustrated in FIGS. 7A-11B and to expose a portion of bearing support.
FIG. 12B is a cross-sectional view of a simplified transmission housing having receiving holes to receive at least one type of the sensors illustrated in FIGS. 7A-11B and to expose a portion of bearing.
Figure 12A:
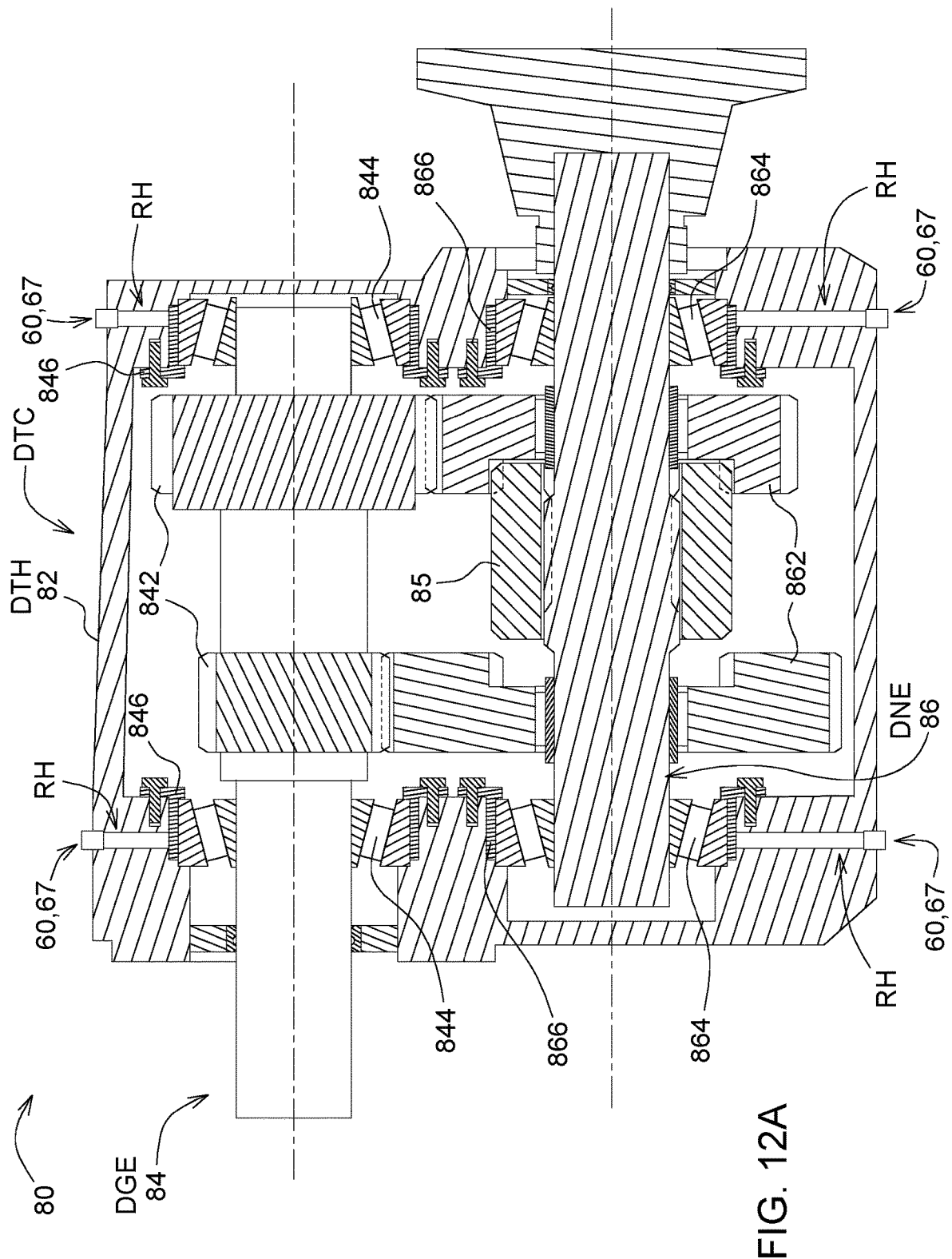

It is noted that the torque sensing assembly 60 may be applied to other drivetrain component DTC such as a transmission 80, with reference to FIG. 12A. The transmission 80 includes a transmission housing 82 (drivetrain housing DTH), an input shaft 84, and output shaft 86. The input shaft 84 includes two gears 842 with different diameters and spaced apart from one another. The output shaft 86 includes two gears 862 with different diameters and spaced apart from one another. The two gears 862 are rotatable relative to the output shaft 86. Each gear 842 meshes with a respective gear 862. A collar 85 is slidable along the output shaft 86 between the gears 862 and is configured to lock one of the gears 862 to allow the power to flow from the input shaft 84 (a driving element DGE) to the output shaft 86 (a driven element DNE). The transmission 80 also includes bearings 844 that allows the input shaft 84 to rotate relative to the transmission housing 82 and bearings 864 that allows the output shaft 86 to rotate relative to the transmission housing 82. Bearing supports 846 are provided to support or secure the bearings 844. Bearing supports 866 are provided to support or secure the bearings 864. The transmission housing 82 may include protrusions extending from the inner surface of the transmission housing 82 toward the bearings 844 and bearings 864. The bearing support 846, 866 are coupled to the protrusions to support the bearings 844, 864. It is noted that FIG. 12A is provided for explanatory purpose; other implementations may include an intermediate shaft (may be considered as a driven or driving element) between the input shaft 84 and the output shaft 86 or other gears.

The transmission housing 82 including receiving holes RH, such as receiving holes 1212, 1214, 1216, 1218, 1220 in the previous implementations extending in a direction from an outer surface of the transmission housing 82 toward the bearings 844, 864. The sensors 67, including the fourth strain gages 68, position sensors 69 (first, second, and third position sensors 692, 694, 696), may be applied to the receiving holes RH to measure the characteristic in or below the receiving hole RH in response to a separation force created between the input shaft 84 (a driving element DGE) to the output shaft 86 (a driven element DNE). In particular, the separation force is created between one of the gears 842 and one of the gears 862 that transfer the power flow from the input shaft 84 to the output shaft 86. The sensors 67 measuring the characteristic in or below (shorter radial direction) the receiving holes RH adjacent to the bearings 844 may transmit signals to the controller 90 (shown in FIG. 13) to obtain the input torque of the input shaft 84. Similarly, the sensors 67 measuring the characteristic in or below (shorter radial direction) the receiving holes RH adjacent to the bearings 864 may transmit signals to the controller 90 to obtain the output torque of the output shaft 86. Optionally, the controller 90 may adopt or prioritize the signals from the sensors 67 adjacent to one of the gears 842 and one of the gears 862 that transfer the power flow. For example, as shown in FIG. 12A, the signals from the sensors 67 adjacent to the right gear 842 and right gear 862 would be adopted to obtain the input and output torque by the controller 90.

Figure 12B:
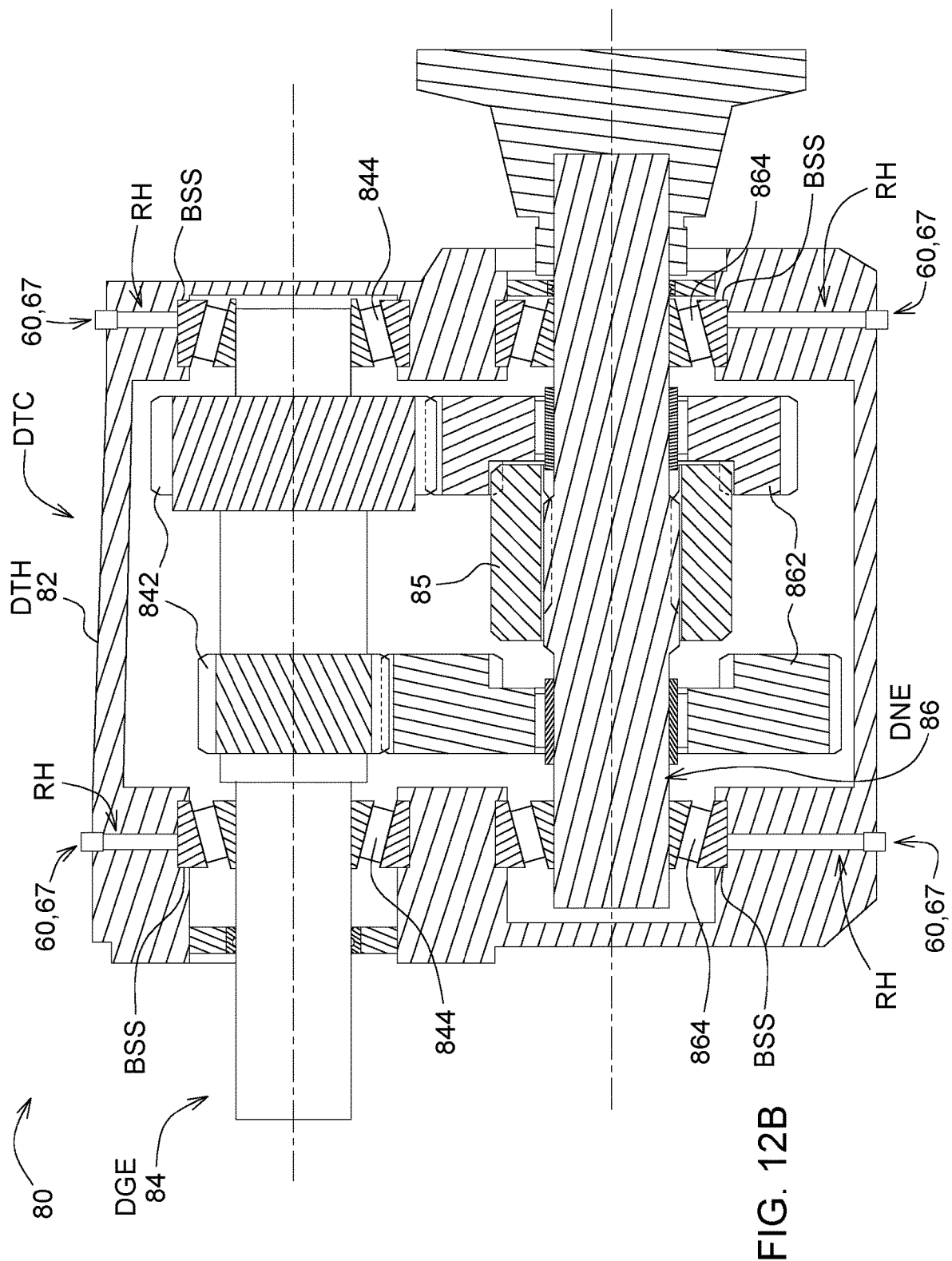

It is noted that in some implementations, as shown in FIG. 12B, the bearing 844, 864 may be directly coupled to or supported by bearing securing structures BSS of the drivetrain housing DTH. The bearing securing structures BSS may be circular grooves to receive and secure the outer race of the bearing 844, 864, for example. The bearing securing structures BSS may also include fasteners, such as pins, coupled between the circular grooves and the outer races of the bearings 844, 864 to prevent the outer races of bearings 844, 864 from rotating relative to the circular grooves. The receiving hole(s) RH may extend from the outer surface of the drivetrain housing DTH to the bearings 844, 864 to expose the outer races of the bearings 844, 864. The receiving hole(s) receives various sensor 67 as discussed. In one example, the strain gaged pin 682 of the fourth strain gage 68 may measure the strain on the outer races of the bearings 844, 864. In another example, the first position sensor 692 may measure the magnet piece 6922 embedded on the outer races of the bearings 844, 864. In another example, the second position sensor 694 may measure the position of top of the pin 6942, 6944 coupled to the outer races of the bearings 844, 864. In another example, the third position sensor 696 measure the distance between the third position sensor 696 and the outer races of the bearings 844, 864.

Figure 13:
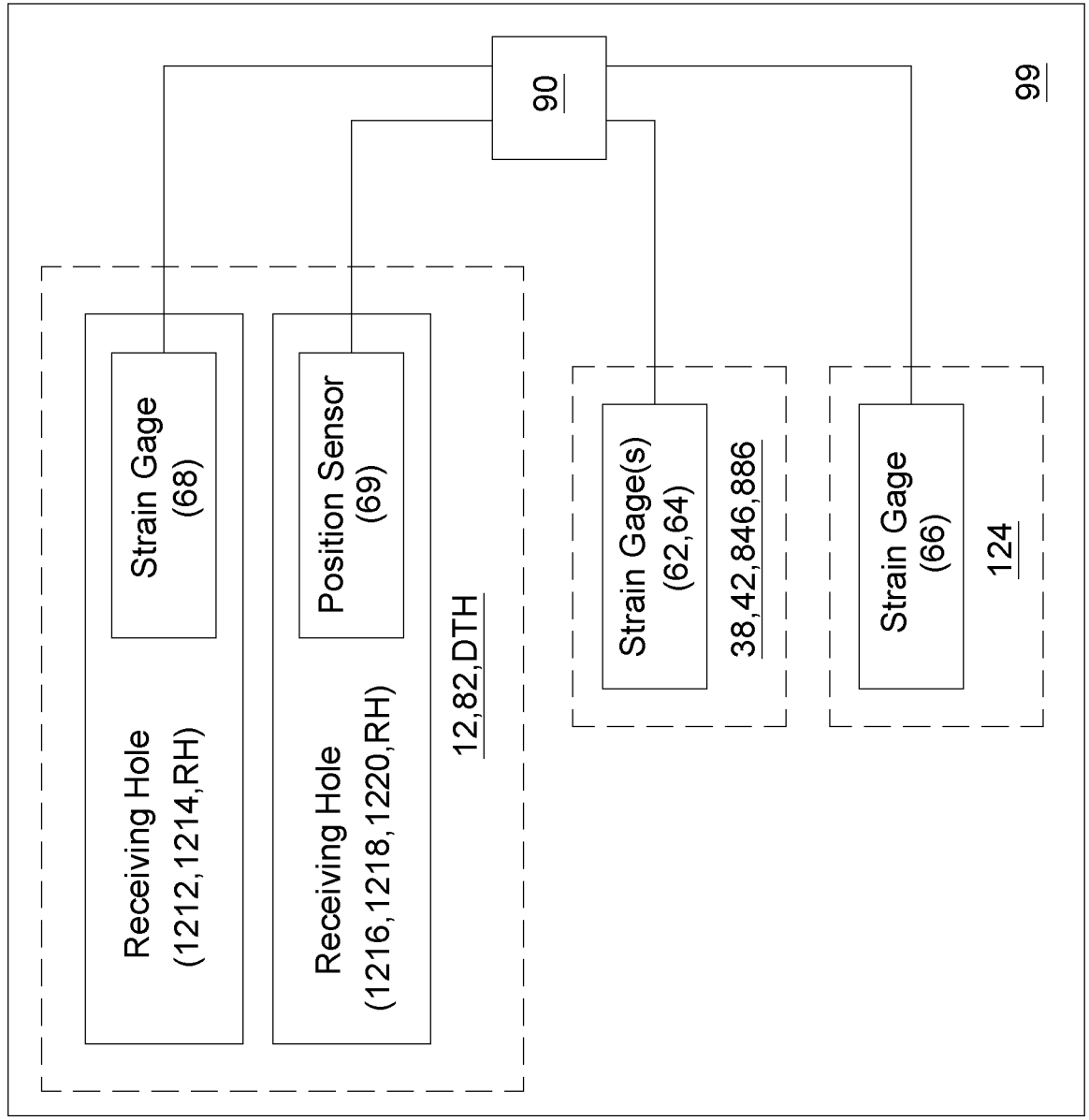
FIG. 13 is a diagrammatic view illustrating the controller connecting the strain gages and position sensors located in different parts of the drivetrain housing and/or bearing support.

As shown in FIG. 13, the first strain gage 62, the second strain gage 64, the third strain gage 66, and/or the fourth strain gage 68 measure the strains on the first bearing support 38, the first housing portion 124 in the receiving hole 1212, 1214 (RH) of the first differential side plate 121 or the protrusion extending from the inners surface of the drivetrain housing DTH (such as transmission housing 82) and transmit the signal(s) indicative of the strain resulting from the separation force F1 to calculate the torque. The relationships between axle input torque, the first bearing support deflection and strain thereof and the drivetrain housing deflection can be mathematically defined based on the size of the gears, tire size and stiffness of the drivetrain components. Alternatively or additionally, the position sensors 69, including the first position sensor 692, second position sensor 694, and/or third position sensor 696, measure a position/movement of the bearing, the bearing support (or the bottom of the receiving hole if it is a blind hole), the pin or the magnet target coupled to the bottom of the receiving hole (if it is a blind hole) or coupled to the bearing support or bearing (if it is a through hole) in or below the receiving hole RH in response to the separation force created between the driving element and the driven element. The signals from the position sensor 69 indicative of the position or movement of the magnet target, pin, the bearing support or bearing are transmitted to the controller 90 to obtain the torque of the driving element or driven element. The controller(s) 90 may include but not limit to engine control unit (ECU), transmission control unit (TCU), and chassis control unit (CCU), and signal controller (analyzer) coupled to the strain gages 62, 64, 66, 68 or position sensors 69. The signal controller communicates with ECU, TCU, CCU through Controller Area Network (CAN) (not shown). CAN frames are normally placed on a CAN Bus, which comprises a first signal carrying line and a second signal carrying line. The controller(s) 90 is connected to the first and second signal carrying lines. The controller(s) 90 may be coupled to or include a memory operable to storing data.

Measurement of torques may be used for different purposes. For example, the torque information can be received by the controller 90, and if there is an excessive torque load, controller 90 may slow the engine speed to ensure the efficiency and longevity of powertrain units. Direct driveline (drivetrain) torque measurement may be used in engine control. By sensing driveline torque more directly, the anticipated engine load can be communicated to the ECU electronically so the engine can be fueled appropriately before the mechanical load is transmitted through the driveline components and pulls the engine down (power management). Direct driveline torque measurement may be used for adaptive shift control (ASC) in a powertrain control unit to gears in an appropriate manner for different slope of ground surface. Direct driveline strain measurement may also be used in driveline prognostics. The drivetrain strain or position signals can be monitored and compared to a normal driveline signature. Deviations from this normal signal may indicate damage incurred by gears and bearings. A sustained deviation from normal can be used to warn the operator or dealer of impending driveline failure.

Without in any way limiting the scope, interpretation, or application of the claims appearing below, a technical effect of one or more of the example embodiments disclosed herein is to measure the strain or position from the bearing(s), bearing support(s) or drivetrain housing where the other loadings, such as vehicle structural loads, may not interfere with the measurement.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An axle assembly coupled to a drive shaft, the axle assembly comprising:
   a first axle unit;
   a second axle unit;
   a differential coupled to the first axle unit and the second axle unit therebetween;
   an axle housing including a differential housing portion of the differential;
   a drive pinion positioned within the axle housing;
   a ring gear engaged with the drive pinion and driven by the drive pinion to rotate;
   a carrier attached to the ring gear and configured to rotate with the ring gear;
   a differential pinion coupled to the carrier operable to rotate with the ring gear and to self-rotate about a differential pinion axis;
   a first side gear and a second side gear respectively engaged with the differential pinion and driven by the differential pinion;
   a first axle shaft coupled to and rotating with the first side gear;
   a second axle shaft coupled to and rotating with the second side gear;
   a first bearing coupled to the axle housing and rotatable with the carrier;
   a first bearing support coupled to the axle housing and configured to support the first bearing; and
   a torque sensing assembly coupled to at least one of the axle housing and the first bearing support and the torque sensing assembly including at least one sensor;
   wherein the differential housing portion includes a first differential side plate to which the first bearing support is coupled, the first differential side plate includes a receiving hole extending in a direction from a surface of the differential housing portion toward the first bearing, and the receiving hole is configured to receive the sensor operable to measure a characteristic in or below the receiving hole in response to a separation force created between the drive pinion and the ring gear;
   wherein the sensor includes a body extending along the receiving hole, and the torque sensing assembly comprises a magnet piece coupled to one of the first bearing support and an outer race of the first bearing and located under and corresponding to the receiving hole of the first differential side plate, and the characteristic includes a position of the magnet piece relative to the sensor.

2. The axle assembly of claim 1, wherein the magnet piece is moveable with one of the first bearing support and the outer race of the first bearing in response to the separation force.

3. The axle assembly of claim 1, wherein the receiving hole is a through hole to expose the magnet piece to a bottom of the body of the sensor.

4. The axle assembly of claim 1, wherein a top of the body of the sensor is coupled to a portion of the receiving hole adjacent to the surface of the differential housing portion.

5. An axle assembly coupled to a drive shaft, the axle assembly comprising:
   a first axle unit;
   a second axle unit;
   a differential coupled to the first axle unit and the second axle unit therebetween;
   an axle housing including a differential housing portion of the differential;
   a drive pinion positioned within the axle housing;
   a ring gear engaged with the drive pinion and driven by the drive pinion to rotate;
   a carrier attached to the ring gear and configured to rotate with the ring gear;
   a differential pinion coupled to the carrier operable to rotate with the ring gear and to self-rotate about a differential pinion axis;
   a first side gear and a second side gear respectively engaged with the differential pinion and driven by the differential pinion;
   a first axle shaft coupled to and rotating with the first side gear;
   a second axle shaft coupled to and rotating with the second side gear;
   a first bearing coupled to the axle housing and rotatable with the carrier;
   a first bearing support coupled to the axle housing and configured to support the first bearing; and
   a torque sensing assembly coupled to at least one of the axle housing and the first bearing support and the torque sensing assembly including at least one sensor;
   wherein the differential housing portion includes a first differential side plate to which the first bearing support is coupled, the first differential side plate includes a receiving hole extending in a direction from a surface of the differential housing portion toward the first bearing, and the receiving hole is configured to receive the sensor operable to measure a characteristic in or below the receiving hole in response to a separation force created between the drive pinion and the ring gear;
   wherein the sensor is a position sensor, the torque sensing assembly comprises a pin extending along the receiving hole and having a lower portion coupled to one of the first bearing support and an outer race of the first bearing, and the characteristic includes a position of the pin relative to the sensor.

6. The axle assembly of claim 5, wherein the lower portion of the pin is threaded, and at least one of the first bearing support and the outer race of the first bearing includes a threaded bore configured to receive and secure the lower portion of the pin.

7. The axle assembly of claim 5, wherein at least one of the first bearing support and the outer race of the first bearing includes a bore, and the lower portion of the pin and the bore are press-fit.

8. The axle assembly of claim 5, wherein the sensor measures the position of a top of the pin, and the pin is moveable in response to the separation force created between the drive pinion and the ring gear.

9. The axle assembly of claim 5, wherein a wall surrounded the receiving hole of the first differential side plate and the pin are spaced apart for clearance, such that the pin moves within the receiving hole without contacting the wall surrounded the receiving hole.

10. An axle assembly coupled to a drive shaft, the axle assembly comprising:
a first axle unit;
a second axle unit;
a differential coupled to the first axle unit and the second axle unit therebetween;
an axle housing including a differential housing portion of the differential;
a drive pinion positioned within the axle housing;
a ring gear engaged with the drive pinion and driven by the drive pinion to rotate;
a carrier attached to the ring gear and configured to rotate with the ring gear;
a differential pinion coupled to the carrier operable to rotate with the ring gear and to self-rotate about a differential pinion axis;
a first side gear and a second side gear respectively engaged with the differential pinion and driven by the differential pinion;
a first axle shaft coupled to and rotating with the first side gear;
a second axle shaft coupled to and rotating with the second side gear;
a first bearing coupled to the axle housing and rotatable with the carrier;
a first bearing support coupled to the axle housing and configured to support the first bearing; and
a torque sensing assembly coupled to at least one of the axle housing and the first bearing support and the torque sensing assembly including at least one sensor;
wherein the differential housing portion includes a first differential side plate to which the first bearing support is coupled, the first differential side plate includes a receiving hole extending in a direction from a surface of the differential housing portion toward the first bearing, and the receiving hole is configured to receive the sensor operable to measure a characteristic in or below the receiving hole in response to a separation force created between the drive pinion and the ring gear;
wherein the receiving hole is a blind hole, the sensor is a position sensor and configured to measure a distance between the sensor and a bottom of the receiving hole, and the distance is changeable in response to the separation force created between the drive pinion and the ring gear.

11. A differential of an axle assembly, comprising:
a differential housing portion;
a drive pinion positioned within the differential housing portion;
a ring gear engaged with the drive pinion and driven by the drive pinion to rotate;
a carrier attached to the ring gear and configured to rotate with the ring gear;
a differential pinion coupled to the carrier operable to rotate with the ring gear and to self-rotate about a differential pinion axis;
a first side gear engaged with the differential pinion;
a first bearing coupled to the differential housing portion and rotatable with the carrier;
a first bearing support coupled to the differential housing portion and configured to support the first bearing; and
a torque sensing assembly coupled to at least one of the differential housing portion and the first bearing support and the torque sensing assembly including at least one sensor;
wherein the differential housing portion includes a first differential side plate to which the first bearing support is coupled, the first differential side plate includes a receiving hole extending in a direction from a surface of the differential housing portion toward the first bearing, and the receiving hole is configured to receive the sensor operable to measure a characteristic in or below the receiving hole in response to a separation force created between the drive pinion and the ring gear;
wherein the sensor is a position sensor, the torque sensing assembly comprises a pin extending along the receiving hole and having a lower portion coupled to one of the first bearing support and an outer race of the first bearing, and the characteristic includes a position of the pin relative to the sensor.

12. A drivetrain component, comprising:
a housing;
a driving element positioned within the housing;
a driven element engaged with the driving element and driven by the driving element to rotate;
a bearing coupled to the housing and rotatable with one of the driving element and the driven element;
a bearing support coupled to the housing and configured to support the bearing; and
a torque sensing assembly coupled to at least one of the housing and the bearing support and the torque sensing assembly including at least one sensor;
wherein the housing includes a side plate or a protrusion extending from an inner surface of the housing toward the bearing, the bearing support is coupled to the side plate or the protrusion, the side plate or the protrusion includes a receiving hole extending in a direction from an outer surface of the housing toward the bearing, and the receiving hole is configured to receive the sensor operable to measure a characteristic in or below the receiving hole in response to a separation force created between the driving element and the driven element
wherein the sensor includes a body extending along the receiving hole, the torque sensing assembly comprises a magnet piece coupled to one of the bearing support and an outer race of the bearing and located under and corresponding to the receiving hole, and the characteristic includes a position of the magnet piece relative to the sensor.

13. The drivetrain component of claim 12, further comprising a carrier, wherein the drivetrain component is a differential, the driving element is a drive pinion, the driven element is a ring gear, the carrier attaches to the ring gear such that the bearing is rotatable with the carrier and the ring gear.

14. The drivetrain component of claim 12, wherein the drivetrain component is a transmission, the driving element is an input shaft, the driven element is another shaft configured to mesh with the input shaft.

15. The drivetrain component of claim 12, wherein the magnet piece is moveable with one of the bearing support and the outer race of the bearing in response to the separation force.

16. The drivetrain component of claim 15, wherein the receiving hole is a through hole to expose the magnet piece to a bottom of the body of the sensor.

17. A drivetrain component, comprising:
a housing;
a driving element positioned within the housing;
a driven element engaged with the driving element and driven by the driving element to rotate;
a bearing coupled to the housing and rotatable with one of the driving element and the driven element;
a bearing support coupled to the housing and configured to support the bearing; and
a torque sensing assembly coupled to at least one of the housing and the bearing support and the torque sensing assembly including at least one sensor;
wherein the housing includes a side plate or a protrusion extending from an inner surface of the housing toward the bearing, the bearing support is coupled to the side plate or the protrusion, the side plate or the protrusion includes a receiving hole extending in a direction from an outer surface of the housing toward the bearing, and the receiving hole is configured to receive the sensor operable to measure a characteristic in or below the receiving hole in response to a separation force created between the driving element and the driven element;
wherein the sensor is a position sensor, the torque sensing assembly comprises a pin extending along the receiving hole and having a lower portion coupled to one of the bearing support and an outer race of the bearing, and the characteristic includes a position of the pin relative to the sensor.

18. The drivetrain component of claim 17, wherein the sensor measures the position of a top of the pin, and the pin is moveable in response to the separation force created between the driving element and the driven element.

19. A drivetrain component, comprising:
a housing;
a driving element positioned within the housing;
a driven element engaged with the driving element and driven by the driving element to rotate;
a bearing coupled to the housing and rotatable with one of the driving element and the driven element;
a bearing support coupled to the housing and configured to support the bearing; and
a torque sensing assembly coupled to at least one of the housing and the bearing support and the torque sensing assembly including at least one sensor;
wherein the housing includes a side plate or a protrusion extending from an inner surface of the housing toward the bearing, the bearing support is coupled to the side plate or the protrusion, the side plate or the protrusion includes a receiving hole extending in a direction from an outer surface of the housing toward the bearing, and the receiving hole is configured to receive the sensor operable to measure a characteristic in or below the receiving hole in response to a separation force created between the driving element and the driven element;
wherein the receiving hole is a blind hole, the sensor is a position sensor and configured to measure a distance between the sensor and a bottom of the receiving hole, and the distance is changeable in response to the separation force created between the driving element and the driven element.

20. A drivetrain component, comprising:
a housing having a bearing securing structure;
a driving element positioned within the housing;
a driven element engaged with the driving element and driven by the driving element to rotate;
a bearing coupled to the bearing securing structure of the housing and rotatable with one of the driving element and the driven element; and
a torque sensing assembly coupled to at least one of the housing and the bearing and the torque sensing assembly including at least one sensor;
wherein the housing includes a receiving hole extending in a direction from a surface of the housing toward the bearing, and the receiving hole is configured to receive the sensor operable to measure a characteristic in or below the receiving hole in response to a separation force created between the driving element and the driven element
wherein the sensor is a position sensor, the torque sensing assembly comprises a pin extending along the receiving hole and having a lower portion coupled to an outer race of the bearing, and the characteristic includes a position of the pin relative to the sensor.

* * * * *